United States Patent
Huang et al.

(10) Patent No.: US 9,529,179 B2
(45) Date of Patent: Dec. 27, 2016

(54) LENS ASSEMBLY

(71) Applicant: Zhejiang Sunny Optics Co., Ltd., Ningbo (CN)

(72) Inventors: Lin Huang, Ningbo (CN); Fujian Dai, Ningbo (CN)

(73) Assignee: Zhejiang Sunny Optics Co., Ltd. (CN)

( * ) Notice: Subject to any disclaimer, the term of this patent is extended or adjusted under 35 U.S.C. 154(b) by 0 days.

(21) Appl. No.: 14/777,698

(22) PCT Filed: Jan. 30, 2015

(86) PCT No.: PCT/CN2015/072056
§ 371 (c)(1),
(2) Date: Sep. 16, 2015

(87) PCT Pub. No.: WO2016/008299
PCT Pub. Date: Jan. 21, 2016

(65) Prior Publication Data
US 2016/0231532 A1    Aug. 11, 2016

(30) Foreign Application Priority Data

Jul. 15, 2014 (CN) .......................... 2014 1 0337038
Jul. 15, 2014 (CN) ...................... 2014 2 0390058 U

(51) Int. Cl.
*G02B 7/02* (2006.01)
*G02B 13/00* (2006.01)
(Continued)

(52) U.S. Cl.
CPC .............. *G02B 13/0045* (2013.01); *G02B 9/60* (2013.01); *G02B 13/00* (2013.01); *G02B 13/06* (2013.01); *G02B 13/18* (2013.01); *H04N 13/0203* (2013.01)

(58) Field of Classification Search
CPC ................................................... G02B 13/0045
(Continued)

(56) References Cited

U.S. PATENT DOCUMENTS

2013/0107375 A1    5/2013    Huang et al.
2013/0308206 A1    11/2013   Hsu et al.
(Continued)

FOREIGN PATENT DOCUMENTS

CN          103076665 A     5/2013
CN          10342847 A      12/2013
(Continued)

OTHER PUBLICATIONS

International Search Report for Application No. PCT/CN2015/072056 dated Apr. 29, 2015.

*Primary Examiner* — James Jones
(74) *Attorney, Agent, or Firm* — Lerner, David, Littenberg, Krumholz & Mentlik, LLP

(57) ABSTRACT

Provided is a lens assembly including: a first lens, a second lens, a third lens, a fourth lens, a fifth lens from an object side of the lens assembly to an image side of the lens assembly in turn. The first lens is of a negative refracting power, an object side thereof is of a convexity, an image side thereof is of a concavity. The second lens is of a positive refracting power, an image side thereof is of a convexity. The third lens is of a negative refracting power, an image side thereof is of a concavity. The fourth lens is of a positive refracting power, an image side thereof is of a convexity. The fifth lens is of a negative refracting power, an object side thereof is of a convexity, an image side thereof is of a concavity. The lens assembly meets: $0<(R3+R4)/(R3-R4)<1.2$ and $7<T12/T23<25$.

20 Claims, 11 Drawing Sheets

(51) Int. Cl.
*G02B 13/06* (2006.01)
*G02B 13/18* (2006.01)
*G02B 9/60* (2006.01)
*H04N 13/02* (2006.01)

(58) Field of Classification Search
USPC .......................................................... 359/714
See application file for complete search history.

(56) References Cited

U.S. PATENT DOCUMENTS

2014/0029116 A1    1/2014  Tsai et al.
2016/0091696 A1*  3/2016  Lin ........................ G02B 13/18
                                                                                                    359/714

FOREIGN PATENT DOCUMENTS

| CN | 103576285 A | 2/2014 |
| CN | 104166220 A | 11/2014 |
| CN | 204009194 U | 12/2014 |
| JP | 2010008562 A | 1/2010 |

* cited by examiner

LENS ASSEMBLY

CROSS-REFERENCE TO RELATED APPLICATION

The present application is a national phase entry under 35 U.S.C. §371 of International Application No. PCT/CN2015/072056, filed Jan. 30, 2015, which claims priority to Chinese Patent Application Nos. 201410337038.8 and 201420390058.7, both filed with the State Intellectual Property Office of P. R. China on Jul. 15, 2014, the entire contents of which are incorporated herein by reference.

FIELD

The present disclosure relates to a camera technology, and more particularly to a lens assembly including five lenses.

BACKGROUND

In recent years, along with the development of a chip technology of complementary metal-oxide semiconductor (CMOS), a pixel size of a chip is getting smaller and smaller; and the requirement on imaging quality of a matching optical system is higher and higher, and the size of an optical lens in cellphone or digital camera is also getting smaller and smaller. Along with the development of technology, a three-dimensional (3D) interactive lens assembly has brought digital and three-dimensional world into people's daily life. However, it is impossible for a common lens assembly to meet the demand on resolution for the 3D interactive lens assembly due to its small size and fewer lenses, as a result, it is required to increase the number of lenses which makes an optical total length thereof increase, thereby it is hard to concurrently reflect the miniaturization. The five-lens assembly, which has been disclosed in Chinese Patent Application, published as No. CN103477264, entitled with "lens assembly for taking an image and device thereof", includes a first lens being of a negative refractive power; a second lens being of a positive refractive power; a third lens being of a negative refractive power; a fourth lens being of a positive refractive power; and a fifth lens being of a negative refractive power. The lens assembly being of such five-lens structure may have a high resolution and achieve the miniaturization, but it cannot effectively prevent distortion and thermal difference, so that an imaging quality is decreased. Besides, a total track length of the lens assembly is long, which needs to be shortened further.

Therefore, it is necessary to provide a lens assembly which is miniaturized and has a high imaging quality to apply to the 3D interactive field.

SUMMARY

Embodiments of the present disclosure seek to solve at least one of the problems existing in the related art.

The lens assembly according to embodiments of the present disclosure includes: a first lens, a second lens, a third lens, a fourth lens, and a fifth lens from an object side of the lens assembly to an image side of the lens assembly in turn, wherein the first lens is of a negative refracting power, an object side of the first lens is of a convexity, an image side of the first lens is of a concavity;

the second lens is of a positive refracting power, an image side of the second lens is of a convexity;

the third lens is of a negative refracting power, an image side of the third lens is of a concavity;

the fourth lens is of a positive refracting power, an image side of the fourth lens is of a convexity; and the fifth lens is of a negative refracting power, an object side of the fifth lens is of a convexity, an image side of the fifth lens is of a concavity, and the object side is provided with one inflection point, a diaphragm is arranged between the first lens and the second lens, the lens assembly meets the following formulas:

$0<(R3+R4)/(R3-R4)<1.2$; and $7<T12/T23<25$, wherein R3 represents a curvature radius of the object side of the second lens, R4 represents a curvature radius of the image side of the second lens, T12 represents a distance between the first lens and the second lens in a direction of an optical axis, and T23 represents a distance between the second lens and the third lens in the direction of the optical axis.

It is favorable for the lens assembly to have a wide angel and reduce a sensitivity to tolerance when meeting the formula of $0<(R3+R4)/(R3-R4)<1.2$. Also, it may guarantee the lens assembly the wide angle and promote the lens assembly to be miniaturized when meeting the formula of $7<T12/T23<25$.

The first lens and the second lens are configured in such manner so that the lens assembly may have a wide angle and decreased sensitivity to tolerance. According to embodiments of the present disclosure, a diaphragm is arranged between the first lens and the second lens, other than arranged between the second lens and the third lens in the conventional lens assembly, so as to improve resolution of system.

The object side of the fifth lens is of a convexity near the optical axis, which is converted into a concavity gradually toward to its periphery; the image side of the fifth lens is of a concavity near the optical axis, which is converted into a convexity gradually toward to its periphery, so that the fifth lens being of such special shape with the curved surfaces and the inflection points, respectively, may effectively correct distortion, thereby to acquire a better imaging quality.

According to embodiments of the present disclosure the lens assembly is provided in such a manner that five lens are of different refracting powers and different curvature radiuses, respectively; arranged with a diaphragm between the first lens and the second lens; configured with suitable distances between every adjacent two lens; and designed with a shape breaking through conventional designing, so as to overcome technical defects in the art, thereby to provide a new solution satisfying a current specification requirement and performance requirement, which may not only provide advantages such as a large aperture and miniaturization under the premise of ensuring a wide angle and high resolution, but also effectively reduce thermal difference and excellently correct distortion.

In some embodiments, the lens assembly meets the following formulas:

$0.8<f2/f<1.4$; and $0.6<SD/TD<0.8$, wherein f2 represents a focal length of the second lens, f represents a focal length of the lens assembly, SD represents a distance from the diaphragm to the image side of the fifth lens in the direction of the optical axis, and TD represents a distance from the object side of the first lens to the image side of the fifth lens in the direction of the optical axis.

It is favorable for the lens assembly to have a characteristic of a wide angel, may promote the lens assembly to be miniaturized and may improve the resolution when meeting the above formulas.

In some embodiments, the second lens is made of a glass material.

In some embodiments, the fourth lens is made of a glass material.

Either the second lens or the fourth lens is made of the glass material, so as to effectively avoid the adverse effect of thermal difference on the lens assembly, so that the lens assembly may have a more stable and reliable imaging quality. When the fourth lens is made of the glass material, it may eliminate the thermal difference in a better way.

In some embodiments, the object side of the second lens is of a convexity.

In some embodiments, the object side of the third lens is of a convexity.

In some embodiments, the object side of the fourth lens is of a convexity.

In some embodiments, the lens assembly meets the following formula:

$$-3.2 < f1/f2 < -1.4,$$

wherein f1 represents a focal length of the first lens, f2 represents a focal length of the second lens.

It may improve the characteristic of the wide angle of the lens assembly when meeting the above formula.

In some embodiments, the lens assembly meets the following formula:

$$-4 < f1/f < -2,$$

wherein f1 represents a focal length of the first lens, f represents a focal length of the lens assembly.

It may provide the lens assembly sufficient refracting power, and maintain the characteristics of the wide angel of the lens assembly when meeting the above formula.

In some embodiments, the lens assembly meets the following formula:

$$0.2 < (T12+T23+T34+T45)/TTL < 0.4,$$

wherein T12 represents the distance between the first lens and the second lens in the direction of the optical axis, T23 represents the distance between the second lens and the third lens in the direction of the optical axis, T34 represents a distance between the third lens and the fourth lens in the direction of the optical axis, T45 represents a distance between the fourth lens and the fifth lens in the direction of the optical axis, and TTL represents a total track length of the lens assembly.

In this way, the five lens in the lens assembly may be arranged at intervals in a reasonable manner, so as to improve the imaging quality, and shorten the total track length of the lens assembly.

In some embodiments, the lens assembly meets the following formula:

$$0.2 < ImgH/TTL < 0.4,$$

wherein ImgH represents a half-length of a diagonal of an effective pixel region of the lens assembly at an imaging surface, and TTL represents a total track length of the lens assembly.

The above formula may enable the lens assembly to be maintained the characteristic of miniaturization so as to be installed in a thin and portable electronic product.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
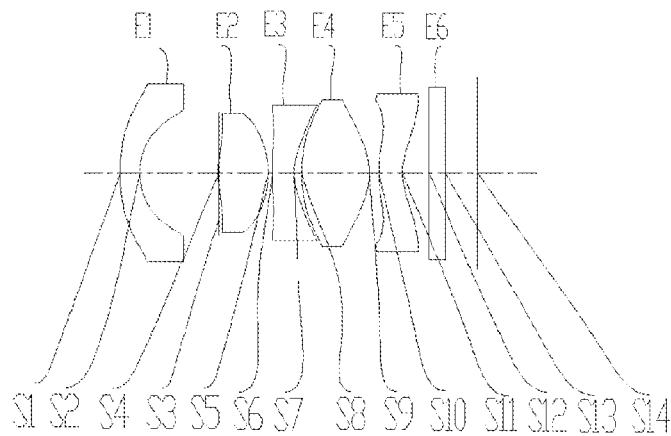
FIG. 1 is a schematic view of the lens assembly according to Embodiment 1 of the present disclosure.
Figure 2:
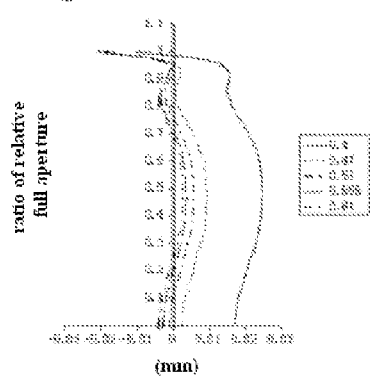
FIGS. 2 to 5 are diagrams showing a longitudinal aberration (mm) curve, an astigmatism curve (mm), a distortion curve (%) and a lateral color curve (μm) of the lens assembly in Embodiment 1, respectively.
Figure 3:
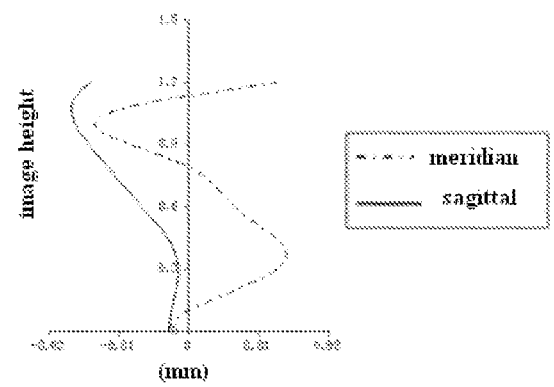
Figure 4:
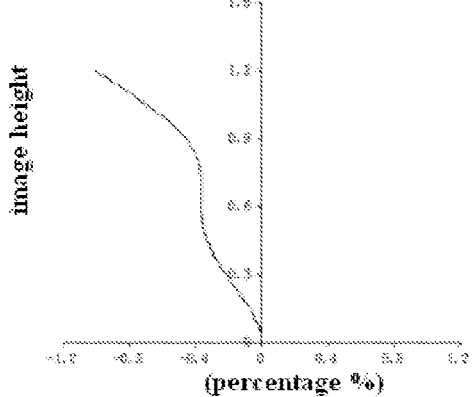
Figure 5:
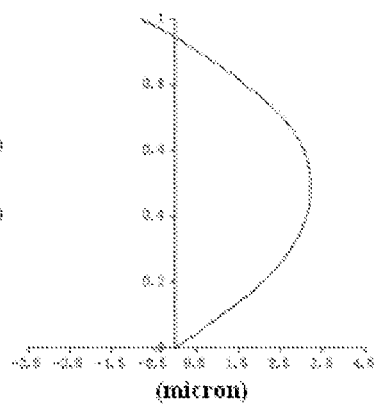

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

In the description of the present disclosure, it is to be understood that terms such as "first" and "second" are used herein for purposes of description and are not intended to indicate or imply relative importance or to imply the number of indicated technical features. Thus, the features defined with "first" and "second" may explicitly or implicitly include one or more of these features. Furthermore, in the description of the present disclosure, "a plurality of" means two or more than two, unless be specified otherwise.

In the description of the present disclosure, it is to be understood unless specified or limited otherwise, terms such as "mounted", "connected" and "coupled" should be understood broadly, and may be, for example, fixed connections, detachable connections, or integral connections; or may be mechanical connections, electrical connections, or mutual communication; or may be direct connections, indirect connections via intervening structures, connections of inner of two elements, or an interaction relationship between two element, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

A surface shape of the aspheric shape is defined by a formula as follows:

$$x = \frac{ch^2}{1+\sqrt{1-(k+1)c^2h^2}} + \sum A_i h^i,$$

wherein h is a height from any point on the aspheric shape to an optical axis, c is an apex curvature, k is a conic coefficient, $A_i$ is a coefficient for the i-th order of the aspheric.

Referring to FIG. 1, in Embodiment 1, the lens assembly includes a first lens E1, a diaphragm, a second lens E2, a third lens E3, a fourth lens E4, a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive reflecting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive reflecting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, each of the first lens E1 to the fifth lens E5 is made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively; and the optical imaging surface is S14.

In Embodiment 1, each of the parameters is described as below:

TTL=4.53; f=1.32; f1=−2.69; f2=1.42; f3=−1.81; f4=1.27; f5=−2.89; (R3+R4)/(R3−R4)=0.36; f1/f2=−1.89;
T12/T23=19.93; (T12+T23+T34+T45)/TTL=0.28; f2/f=1.07;
SD/TD=0.65; ImgH/TTL=0.26; f1/f=−2.03;
A system parameter: Fno=1.6.

TABLE 1

| Surface No. | Surface type | Curvature radius | Thickness | Material | Conic coefficient |
|---|---|---|---|---|---|
| obj | spherical | infinity | 300.0000 | | |
| 1 | aspheric | 2.9648 | 0.2492 | 1.5351/55.7797 | 1.7563 |
| 2 | aspheric | 0.9433 | 0.9973 | | 0.1812 |
| stop | spherical | infinity | −0.0029 | | |
| 4 | aspheric | 2.2338 | 0.6316 | 1.5351/55.7797 | −3.4342 |
| 5 | aspheric | −1.0446 | 0.0499 | | −0.4075 |
| 6 | aspheric | 3.0615 | 0.2797 | 1.6355/23.7846 | 9.9839 |
| 7 | aspheric | 0.8094 | 0.0959 | | −0.3116 |
| 8 | aspheric | 2.2132 | 0.8578 | 1.5351/55.7797 | 1.3126 |
| 9 | aspheric | −0.8535 | 0.1196 | | −0.4457 |
| 10 | aspheric | 1.4466 | 0.3012 | 1.6355/23.7846 | 1.0586 |
| 11 | aspheric | 0.7464 | 0.3364 | | −0.7965 |
| 12 | spherical | infinity | 0.2100 | 1.5168/64.1673 | |
| 13 | spherical | infinity | 0.4045 | | |
| IMG | spherical | infinity | | | |

The table below shows high-order coefficients A4, A6, A8, A10, A12, A14 and A16 of aspheric shapes of the aspheric lens.

TABLE 2

| Surface No. | A4 | A6 | A8 | A10 | A12 | A14 | A16 |
|---|---|---|---|---|---|---|---|
| 1 | 2.7233E−01 | −3.4251E−01 | 2.6152E−01 | −5.8776E−02 | −1.1040E−01 | 9.7143E−02 | −2.5722E−02 |
| 2 | 5.0046E−01 | −9.4873E−01 | 2.4311E+00 | −3.0474E+00 | −2.3701E+00 | 1.1246E+01 | −1.0819E+01 |
| 4 | −5.0607E−02 | −1.7590E−02 | −1.9641E+00 | 3.6211E+00 | 1.9636E+01 | −1.2287E+02 | 1.6552E+02 |
| 5 | 3.2806E−01 | −8.0165E−01 | 2.6175E−01 | 2.4244E−01 | −3.9175E−01 | −9.3925E−01 | 5.2949E−01 |
| 6 | −5.6484E−01 | 8.2115E−01 | −1.8385E+00 | 1.6015E+00 | 3.0247E+00 | −5.6666E+00 | 2.0850E+00 |
| 7 | −8.8307E−01 | 1.0117E+00 | −1.3550E+00 | 5.3333E−01 | 7.0609E−01 | −3.2683E−01 | −5.8458E−01 |
| 8 | 4.0459E−01 | −1.2155E+00 | 1.9171E+00 | −9.2401E−01 | −1.8692E+00 | 3.0122E+00 | −1.3039E+00 |
| 9 | 4.6303E−01 | −3.7281E−01 | 2.4554E−01 | 6.0320E−01 | −2.6805E−01 | −1.0406E+00 | 8.0386E−01 |
| 10 | −6.4161E−01 | −9.6384E−02 | 5.5972E−01 | −3.7909E−01 | −4.4515E−01 | 4.1618E−01 | −1.0027E−01 |
| 11 | −1.2115E+00 | 1.5147E+00 | −1.4346E+00 | 6.2493E−01 | 2.2291E−01 | −3.8763E−01 | 1.2858E−01 |

Figure 6:
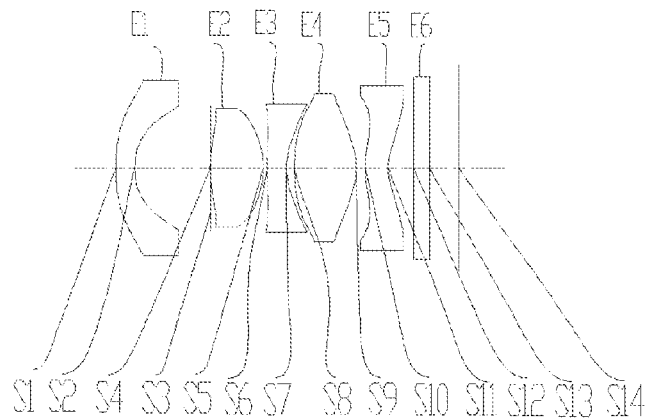
FIG. 6 is a schematic view of the lens assembly according to Embodiment 2 of the present disclosure.
Figure 7:
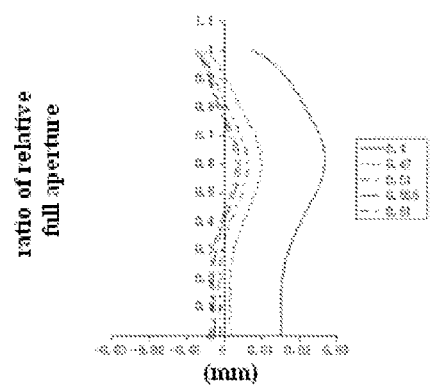
FIGS. 7 to 10 are diagrams showing a longitudinal aberration (mm) curve, an astigmatism curve (mm), a distortion curve (%) and a lateral color curve (μm) of the lens assembly in Embodiment 2, respectively.
Figure 8:
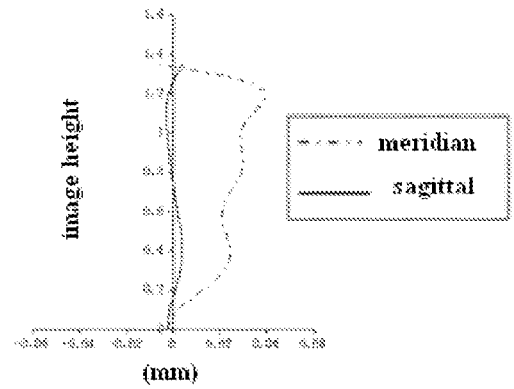
Figure 9:
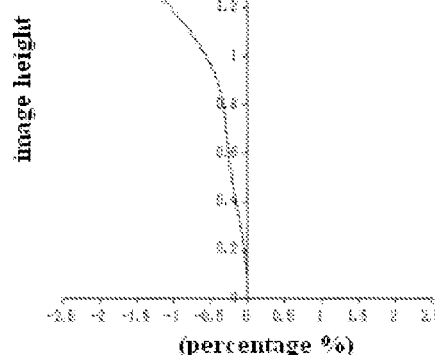
Figure 10:
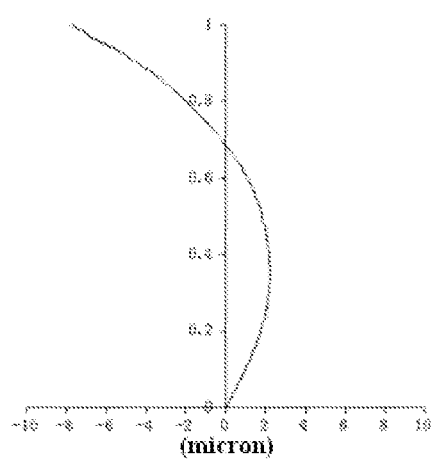

Referring to FIG. 6, in Embodiment 2, the lens assembly includes a first lens E1, a diaphragm, a second lens E2, a third lens E3, a fourth lens E4, a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive reflecting power, an object side of the second lens is of a convexity, an image side of the second lens is of a convexity, and each of the object side and the image side thereof is in an aspheric shape; the third lens E3 is of a negative refracting power, an object side of the third is of a convexity, an image side of the third lens is of a concavity, and each of the object side and the image side thereof is in an aspheric shape; the fourth lens E4 is of a positive reflecting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the fourth lens E4 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 2, each of the parameters is described as below: TTL=4.53; f=1.33; f1=−2.7; f2=1.42; f3=−2.04; f4=1.35; f5=−2.89; (R3+R4)/(R3−R4)=0.3; f1/f2=−1.9; T12/T23=19.93;

(T12+T23+T34+T45)/TTL=0.28; f2/f=1.07; SD/TD=0.65;

ImgH/TTL=0.3; f1/f=−2.03;

A system parameter: Fno=1.6.

TABLE 3

| Surface No. | Surface type | Curvature radius | Thickness | Material | Conic coefficient |
|---|---|---|---|---|---|
| obj | spherical | infinity | 300.0000 | | |
| 1 | aspheric | 2.9648 | 0.2492 | 1.5351/55.7797 | 1.7563 |
| 2 | aspheric | 0.9433 | 0.9973 | | 0.1812 |
| stop | spherical | infinity | −0.0029 | | |
| 4 | aspheric | 1.9895 | 0.6999 | 1.5351/55.7797 | 4.3827 |
| 5 | aspheric | −1.0830 | 0.0499 | | −1.1873 |
| 6 | aspheric | 2.7995 | 0.2600 | 1.6355/23.7846 | 6.3013 |
| 7 | aspheric | 0.8573 | 0.1088 | | −0.1634 |
| 8 | aspheric | 3.1081 | 0.8130 | 1.5858/60.8160 | 4.8425 |
| 9 | aspheric | −0.9602 | 0.1196 | | −0.0777 |
| 10 | aspheric | 1.4466 | 0.3012 | 1.6355/23.7846 | 1.0586 |
| 11 | aspheric | 0.7464 | 0.3364 | | −0.7965 |
| 12 | spherical | infinity | 0.2100 | 1.5168/64.1673 | |
| 13 | spherical | infinity | 0.3867 | | |
| IMG | spherical | infinity | | | |

The table below shows high-order coefficients A4, A6, A8, A10, A12 A14 and A16 of aspheric shapes of the aspheric lens.

TABLE 4

| Surface No. | A4 | A6 | A8 | A10 | A12 | A14 | A16 |
|---|---|---|---|---|---|---|---|
| 1 | 2.7233E−01 | −3.4251E−01 | 2.6152E−01 | −5.8776E−02 | −1.1040E−01 | 9.7143E−02 | −2.5722E−02 |
| 2 | 5.0046E−01 | −9.4873E−01 | 2.4311E+00 | −3.0474E+00 | −2.3701E+00 | 1.1246E+01 | −1.0819E+01 |
| 4 | −4.4915E−02 | −1.2697E+00 | 5.6002E+00 | −1.5734E+01 | 8.0053E+00 | 3.5439E+01 | −5.2888E+01 |
| 5 | 1.9295E−01 | −5.7149E−01 | −3.9835E−02 | 1.1027E+00 | −4.6821E+00 | 9.8064E+00 | −8.5183E+00 |
| 6 | −6.6930E−01 | 1.1346E+00 | −2.0766E+00 | 1.6191E+00 | 3.3109E+00 | −6.9852E+00 | 3.1704E+00 |
| 7 | −8.1691E−01 | 7.1954E−01 | −6.8247E−01 | 1.3423E−01 | 2.9019E−01 | 1.7241E−01 | −8.2735E−01 |
| 8 | 5.1793E−01 | −1.3721E+00 | 1.9720E+00 | −7.6203E−01 | −1.9100E+00 | 2.7560E+00 | −1.1147E+00 |
| 9 | 5.2594E−01 | −4.6904E−01 | 6.7152E−01 | 6.0991E−02 | −2.6810E−01 | −6.5815E−01 | 7.5229E−01 |
| 10 | −6.4161E−01 | −9.6384E−02 | 5.5972E−01 | −3.7909E−01 | −4.4515E−01 | 4.1618E−01 | −1.0027E−01 |
| 11 | −1.2115E+00 | 1.5147E+00 | −1.4346E+00 | 6.2493E−01 | 2.2291E−01 | −3.8763E−01 | 1.2858E−01 |

Figure 11:
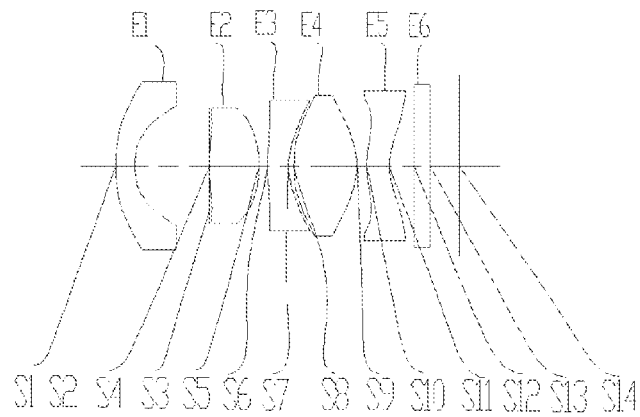
FIG. 11 is a schematic view of the lens assembly according to Embodiment 3 of the present disclosure.
Figure 12:
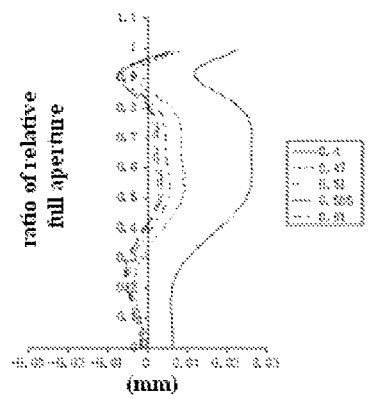
FIGS. 12 to 15 are diagrams showing a longitudinal aberration (mm) curve, an astigmatism curve (mm), a distortion curve (%) and a lateral color curve (μm) of the lens assembly in Embodiment 3, respectively.
Figure 13:
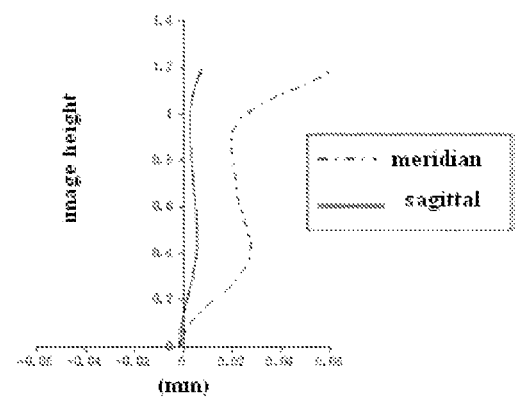
Figure 14:
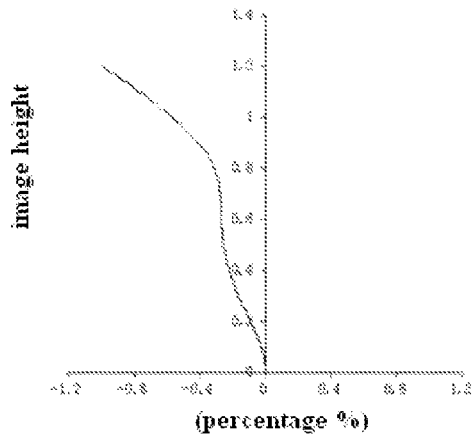
Figure 15:
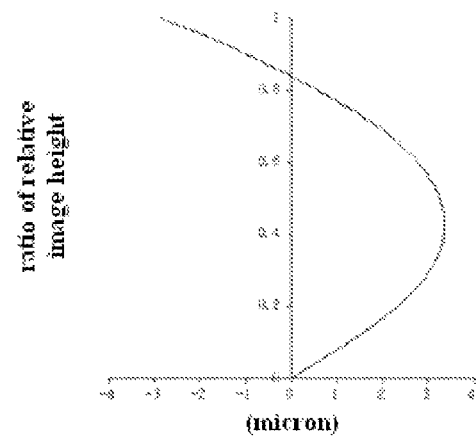

Referring to FIG. 11, in Embodiment 3, the lens assembly includes a first lens E1, a diaphragm, a second lens E2, a third lens E3, a fourth lens E4 and, a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens

TABLE 5

| Surface No. | Surface type | Curvature radius | Thickness | Material | Conic coefficient |
|---|---|---|---|---|---|
| obj | spherical | infinity | 300.0000 | | |
| 1 | aspheric | 2.9648 | 0.2492 | 1.5351/55.7797 | 1.7563 |
| 2 | aspheric | 0.9433 | 0.9973 | | 0.1812 |
| stop | spherical | infinity | −0.0029 | | |
| 4 | aspheric | 2.7811 | 0.6670 | 1.5858/60.8160 | −131.3845 |
| 5 | aspheric | −1.5854 | 0.1108 | | −0.7454 |
| 6 | aspheric | 1.7765 | 0.2797 | 1.6355/23.7846 | −34.3483 |
| 7 | aspheric | 0.7958 | 0.0768 | | −0.7352 |
| 8 | aspheric | 1.7186 | 0.8442 | 1.5351/55.7797 | −2.7342 |
| 9 | aspheric | −0.8936 | 0.1314 | | −0.3720 |
| 10 | aspheric | 1.4634 | 0.2959 | 1.6355/23.7846 | 1.0855 |
| 11 | aspheric | 0.7382 | 0.3364 | | −0.7965 |
| 12 | spherical | infinity | 0.2100 | 1.5168/64.1673 | |
| 13 | spherical | infinity | 0.3891 | | |
| IMG | spherical | infinity | | | |

The table below shows high-order coefficients A4, A6, A8, A10, A12, A14 and A16 of aspheric shapes of the aspheric lens.

TABLE 6

| Surface No. | A4 | A6 | A8 | A10 | A12 | A14 | A16 |
|---|---|---|---|---|---|---|---|
| 1 | 2.7233E−01 | −3.4251E−01 | 2.6152E−01 | −5.8776E−02 | −1.1040E−01 | 9.7143E−02 | −2.5722E−02 |
| 2 | 5.0046E−01 | −9.4873E−01 | 2.4311E+00 | −3.0474E+00 | −2.3701E+00 | 1.1246E+01 | −1.0819E+01 |
| 4 | 8.3539E−01 | −9.7687E+00 | 8.2985E+01 | −4.6704E+02 | 1.5431E+03 | −2.7211E+03 | 1.9627E+03 |
| 5 | −5.9668E−01 | 3.2147E+00 | −1.3130E+01 | 3.0301E+01 | −3.9151E+01 | 2.3630E+01 | −4.5100E+00 |
| 6 | −6.7225E−01 | 2.1115E+00 | −4.5517E+00 | 5.5133E+00 | −7.1449E+00 | −5.1639E+00 | 3.6054E+00 |
| 7 | −1.0211E+00 | 2.0089E+00 | −3.2757E+00 | 3.8849E+00 | −3.5188E+00 | 2.6754E+00 | −1.1797E+00 |
| 8 | 3.5434E−01 | −1.2288E+00 | 2.5403E+00 | −2.0028E+00 | −1.5459E+00 | 3.6392E+00 | −1.7327E+00 |
| 9 | 4.9902E−01 | −4.2807E−01 | 2.9948E−01 | 6.1215E−01 | −3.8960E−01 | −1.0046E+00 | 8.2616E−01 |
| 10 | −6.4207E−01 | −1.0371E−01 | 5.7294E−01 | −3.7959E−01 | −4.6539E−01 | 4.1212E−01 | −8.2675E−02 |
| 11 | −1.2115E+00 | 1.5147E+00 | −1.4346E+00 | 6.2493E−01 | 2.2291E−01 | −3.8763E−01 | 1.2858E−01 | is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 3, each of the parameters is described as below:

TTL=4.59; f=1.33; f1=−2.69; f2=1.82; f3=−2.53; f4=1.24; f5=−2.77; (R3+R4)/(R3−R4)=0.27; f1/f2=−1.48;

T12/T23=8.98; (T12+T23+T34+T45)/TTL=0.29; f2/f=1.37;

SD/TD=0.66; ImgH/TTL=0.26; f1/f=−2.03.

A system parameter: Fno=1.6.

Figure 16:
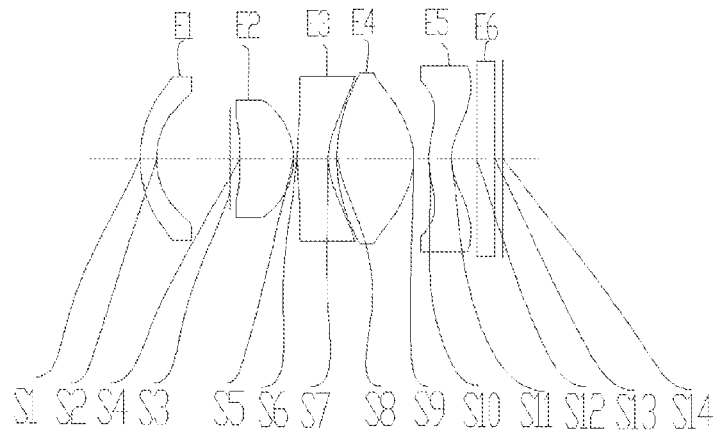
FIG. 16 is a schematic view of the lens assembly according to Embodiment 4 of the present disclosure.
Figure 17:
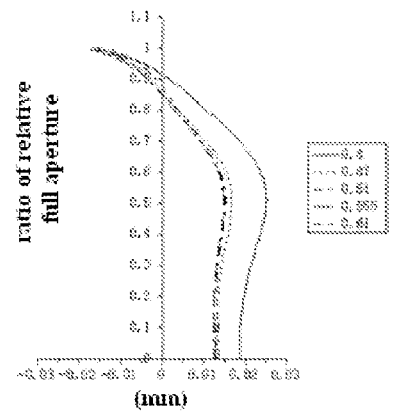
FIGS. 17 to 20 are diagrams showing a longitudinal aberration (mm) curve, an astigmatism curve (mm), a distortion curve (%) and a lateral color curve (μm) of the lens assembly in Embodiment 4, respectively.
Figure 18:
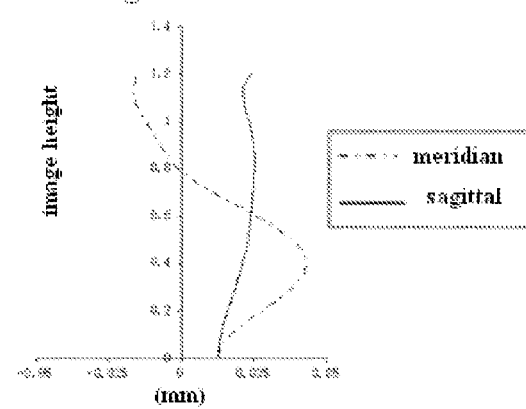
Figure 19:
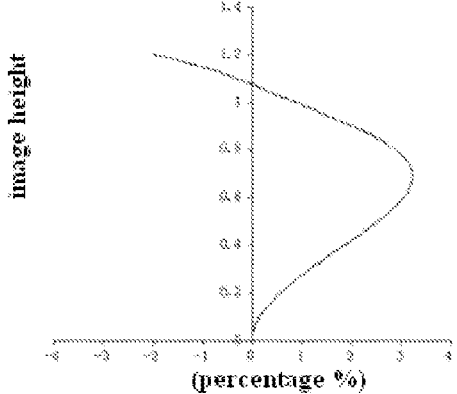
Figure 20:
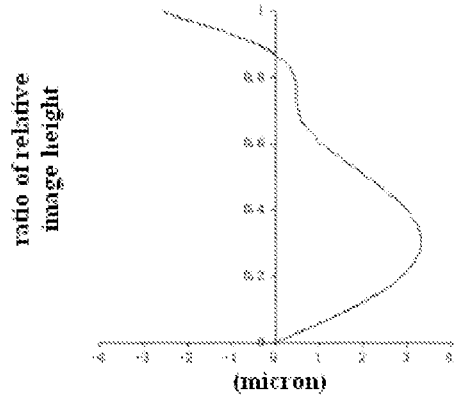

Referring to FIG. 16, in Embodiment 4, the lens assembly includes a first lens E1, a diaphragm, a second lens E2, a third lens E3, a fourth lens E4 and, a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a concavity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 4, each of the parameters is described as below:

TTL=4.42; f=1.3; f1=−5.1; f2=1.59; f3=−2.16; f4=1.29; f5=−2.61; (R3+R4)/(R3−R4)=1.17; f1/f2=−3.197;
T12/T23=22.29; (T12+T23+T34+T45)/TTL=0.3; f2/f=1.22;
SD/TD=0.71; ImgH/TTL=0.27; f1/f=−3.92.
A system parameter: Fno=1.68.

TABLE 7

| Surface No. | Surface type | Curvature radius | Thickness | Material | Conic coefficient |
|---|---|---|---|---|---|
| obj | spherical | infinity | 325.4607 | | |
| 1 | aspheric | 1.7486 | 0.1978 | 1.5351/55.7797 | −0.2510 |
| 2 | aspheric | 1.0247 | 0.8974 | | 0.3785 |
| stop | spherical | infinity | 0.1137 | | |
| 4 | aspheric | −10.9841 | 0.6561 | 1.5858/60.8160 | −24.0357 |
| 5 | aspheric | −0.8822 | 0.0454 | | −1.0132 |
| 6 | aspheric | 2.2125 | 0.3798 | 1.6355/23.7846 | −46.0296 |
| 7 | aspheric | 0.7946 | 0.1067 | | −0.8319 |
| 8 | aspheric | 2.3355 | 0.9374 | 1.5351/55.7797 | 0.5519 |
| 9 | aspheric | −0.8446 | 0.1847 | | −0.4090 |
| 10 | aspheric | 1.0819 | 0.2749 | 1.6355/23.7846 | 0.0435 |
| 11 | aspheric | 0.5914 | 0.3029 | | −1.2164 |
| 12 | spherical | infinity | 0.2278 | 1.5168/64.1673 | |
| 13 | spherical | infinity | 0.0967 | | |
| IMG | spherical | infinity | | | |

The table below shows high-order coefficients A4, A6, A8, A10, A12, A14 and A16 of aspheric shapes of the aspheric lens.

TABLE 8

| Surface No. | A4 | A6 | A8 | A10 | A12 | A14 | A16 |
|---|---|---|---|---|---|---|---|
| 1 | 2.3610E−01 | −1.8930E−01 | 1.1005E−01 | −6.1073E−02 | −3.0903E−02 | 5.4142E−02 | −3.2110E−02 |
| 2 | 3.1106E−01 | −5.7041E−01 | 9.6029E−01 | −1.6072E+00 | −7.3666E−01 | 3.8697E+00 | −3.9183E+00 |
| 4 | −1.6405E−01 | −3.8474E+00 | 3.6716E+01 | −2.1503E+02 | 6.2957E+02 | −9.4467E+02 | 5.7857E+02 |
| 5 | −3.6065E−01 | 1.8333E+00 | −7.6840E+00 | 1.4556E+01 | −1.6148E+01 | 7.8887E+00 | −2.1171E+00 |
| 6 | −3.6059E−01 | 1.2643E+00 | −2.7434E+00 | 2.6050E+00 | 2.5422E−02 | −1.8143E+00 | 9.6299E−01 |
| 7 | −8.1367E−01 | 1.3583E+00 | −1.8994E+00 | 1.8147E+00 | −1.4409E+00 | 9.6045E−01 | −3.3605E−01 |
| 8 | 2.9688E−01 | −8.7556E−01 | 1.3942E+00 | −9.5035E−01 | −5.9926E−01 | 1.2832E+00 | −5.2028E−01 |
| 9 | 4.0066E−01 | −2.5576E+00 | 1.1922E+00 | 2.7106E−01 | −1.3513E−01 | −3.0712E−01 | 2.7776E−01 |
| 10 | −8.6357E−01 | −7.3922E−02 | 2.5123E−01 | −4.8684E−02 | −9.4073E−02 | 1.1482E−01 | −1.6353E−01 |
| 11 | −1.1254E+00 | 1.2016E+00 | −9.2994E−01 | 3.1692E−01 | 1.2593E−01 | −1.2481E−01 | 1.9851E−02 |

Figure 21:
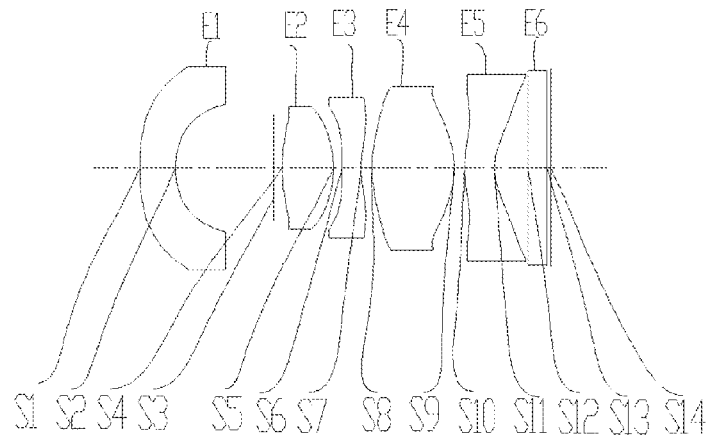
FIG. 21 is a schematic view of the lens assembly according to Embodiment 5 of the present disclosure.
Figure 22:
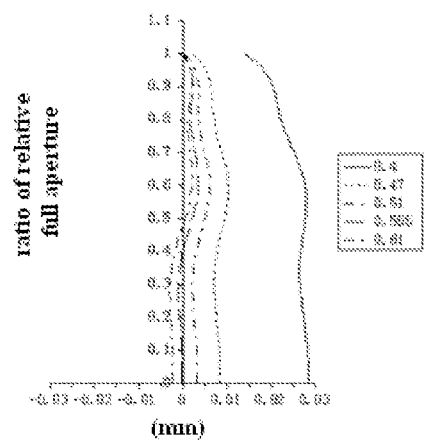
FIGS. 22 to 25 are diagrams showing a longitudinal aberration (mm) curve, an astigmatism curve (mm), a distortion curve (%) and a lateral color curve (μm) of the lens assembly in Embodiment 5, respectively.
Figure 23:
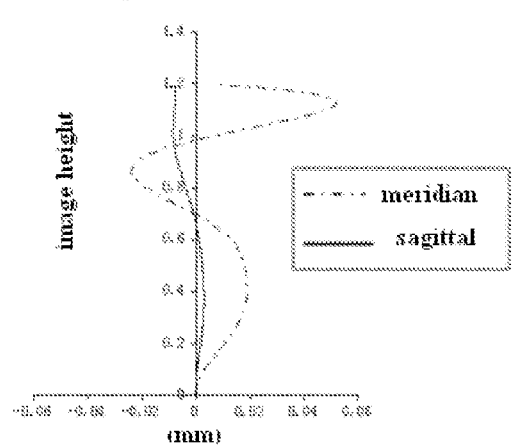
Figure 24:
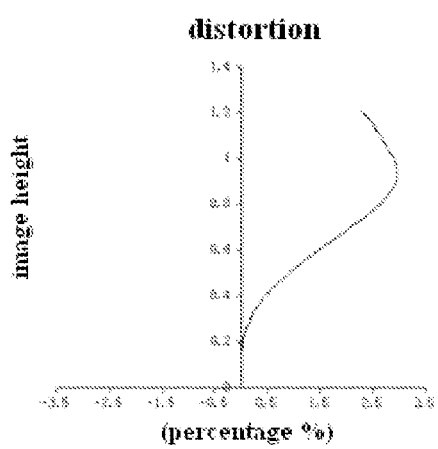
Figure 25:
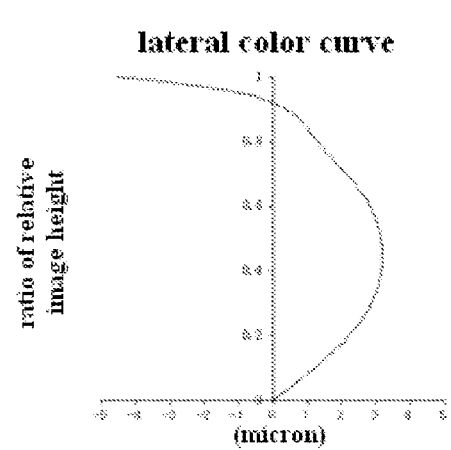

Referring to FIG. 21, in Embodiment 5, the lens assembly includes a first lens E1, a diaphragm, a second lens E2, a third lens E3, a fourth lens E4 and a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a concavity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively; and the optical imaging surface is S14.

In Embodiment 5, each of the parameters is described as below:

TTL=5.07; f=1.3; f1=−3.41; f2=1.46; f3=−1.88; f4=1.38; f5=−2.51; (R3+R4)/(R3−R4)=0.29; f1/f2=−2.33;
T12/T23=11.75; (T12+T23+T34+T45)/TTL=0.33; f2/f=1.13;
SD/TD=0.62; ImgH/TTL=0.24; f1/f=−2.62;
A system parameter: Fno=1.74.

TABLE 9

| Surface No. | Surface type | Curvature radius | Thickness | Material | Conic coefficient |
|---|---|---|---|---|---|
| obj | spherical | infinity | 336.4476 | | |
| 1 | aspheric | 3.6426 | 0.4419 | 1.5351/55.7797 | 4.0375 |

TABLE 9-continued

| Surface No. | Surface type | Curvature radius | Thickness | Material | Conic coefficient |
|---|---|---|---|---|---|
| 2 | aspheric | 1.1668 | 1.2057 | | 1.0601 |
| stop | spherical | infinity | 0.1121 | | |

TABLE 9-continued

| Surface No. | Surface type | Curvature radius | Thickness | Material | Conic coefficient |
|---|---|---|---|---|---|
| 4 | aspheric | 2.2660 | 0.6299 | 1.5858/60.8160 | −77.7614 |
| 5 | aspheric | −1.2451 | 0.1121 | | −9.5119 |
| 6 | aspheric | −7.8776 | 0.2338 | 1.6355/23.7846 | 92.2889 |
| 7 | aspheric | 1.4387 | 0.1317 | | −1.2502 |
| 8 | aspheric | 1.5410 | 1.0176 | 1.5351/55.7797 | −11.0986 |
| 9 | aspheric | −1.0973 | 0.1273 | | −0.2650 |
| 10 | aspheric | 1.4394 | 0.3681 | 1.6355/23.7846 | 0.5559 |
| 11 | aspheric | 0.6840 | 0.4131 | | −1.0529 |
| 12 | spherical | infinity | 0.2355 | 1.5168/64.1673 | |
| 13 | spherical | infinity | 0.0439 | | |
| IMG | spherical | infinity | | | |

The table below shows high-order coefficients A4, A6, A8, A10, A12, A14 and A16 of aspheric shapes of the aspheric lens.

TABLE 10

| Surface No. | A4 | A6 | A8 | A10 | A12 | A14 | A16 |
|---|---|---|---|---|---|---|---|
| 1 | 2.0879E−01 | −1.5095E−01 | 1.2437E−01 | −1.9372E−02 | −3.2889E−02 | 2.0582E−02 | −4.3620E−03 |
| 2 | 4.0049E−01 | −4.3429E−01 | 1.2886E+00 | −8.4113E−01 | −4.8449E−01 | 3.4642E+00 | −2.5645E+00 |
| 4 | 8.5978E−01 | −5.9650E+00 | 3.7558E+01 | −1.6547E+02 | 4.3579E+02 | −6.1471E+02 | 3.5084E+02 |
| 5 | −4.8443E−01 | 1.5191E+00 | −5.8085E+00 | 1.0883E+01 | −1.0430E+01 | 4.5501E+00 | −2.1112E+00 |
| 6 | −4.5629E−01 | 9.3782E−01 | −3.1965E+00 | 3.7170E+00 | −3.8510E−01 | −1.4600E+00 | 1.2540E+00 |
| 7 | −7.5127E−01 | 1.0335E+00 | −1.5092E+00 | 1.3813E+00 | −9.1752E−01 | 7.1452E−01 | −1.8351E−01 |
| 8 | 1.6153E−01 | −6.9210E−01 | 1.1356E+00 | −6.8479E−01 | −3.9430E−01 | 8.6602E−01 | −3.5543E−01 |
| 9 | 2.6597E−01 | −2.0498E−01 | 1.0655E−01 | 2.3332E−01 | −6.1391E−02 | −1.9603E−01 | 1.6407E−01 |
| 10 | −5.9730E−01 | −4.8442E−02 | 3.4126E−01 | −6.6003E−02 | −1.0073E−01 | 8.3835E−02 | −4.7240E−02 |
| 11 | −9.9211E−01 | 1.2492E+00 | −1.0823E+00 | 4.6066E−01 | 7.8616E−02 | −1.1113E−01 | 1.1727E−02 |

Figure 26:
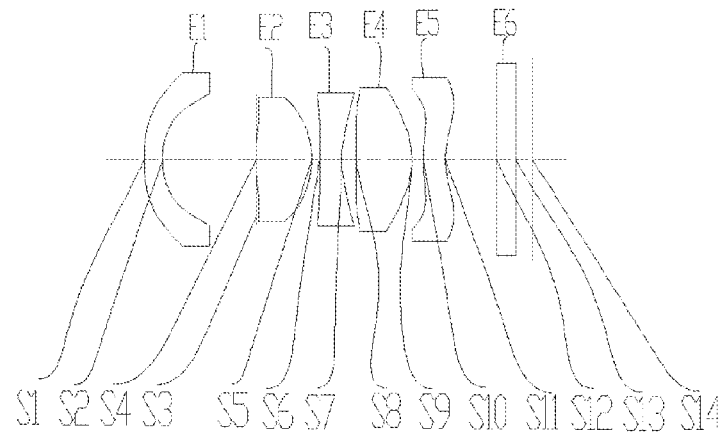
FIG. 26 is a schematic view of the lens assembly according to Embodiment 6 of the present disclosure.
Figure 27:
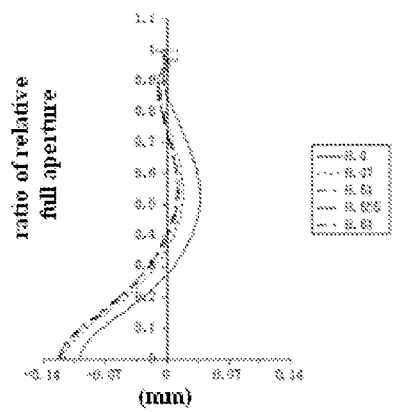
FIGS. 27 to 30 are diagrams showing a longitudinal aberration (mm) curve, an astigmatism curve (mm), a distortion curve (%) and a lateral color curve (μm) of the lens assembly in Embodiment 6, respectively.
Figure 28:
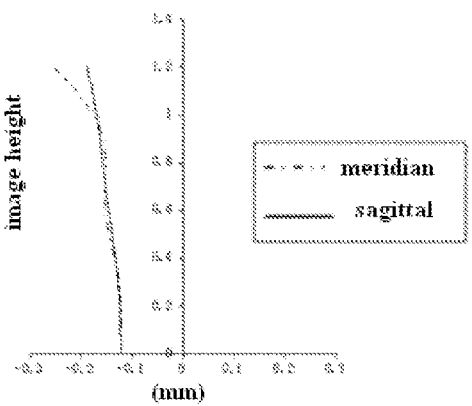
Figure 29:
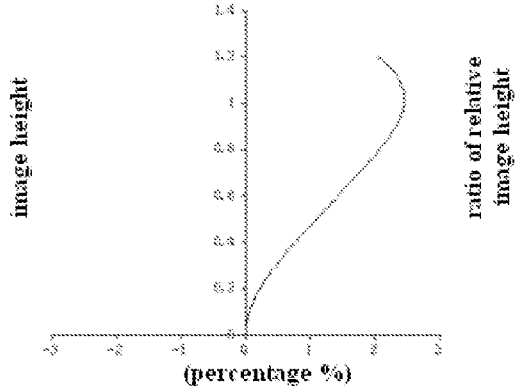
Figure 30:
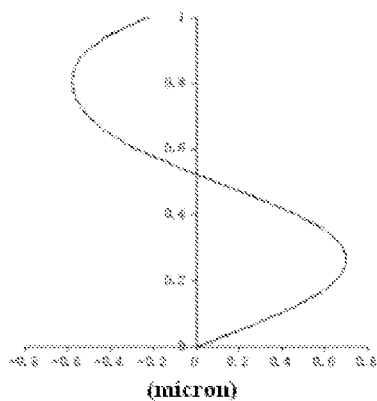

Referring to FIG. 26, in Embodiment 6, the lens assembly includes a first lens E1, a diaphragm, a second lens E2, a third lens E3, a fourth lens E4 and a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a concavity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 6, each of the parameters is described as below:

TTL=4.7; f=1.55; f1=−3.98; f2=1.28; f3=−2.22; f4=1.79; f5=−3.11; (R3+R4)/(R3−R4)=0.44; f1/f2=−3.11; T12/T23=12.12;

(T12+T23+T34+T45)/TTL=0.33; f2/f=0.82; SD/TD=0.63;

ImgH/TTL=0.26; f1/f=−2.57;

A system parameter: Fno=1.66.

TABLE 11

| Surface No. | Surface type | Curvature radius | Thickness | Material | Conic coefficient |
|---|---|---|---|---|---|
| obj | spherical | infinity | 322.9254 | | |
| 1 | aspheric | 2.3207 | 0.2243 | 1.5351/55.7797 | 1.6502 |
| 2 | aspheric | 1.0750 | 1.1340 | | 0.2307 |
| stop | spherical | infinity | −0.0068 | | |
| 4 | aspheric | 2.4994 | 0.6772 | 1.5858/60.8160 | −232.8882 |
| 5 | aspheric | −0.9658 | 0.0930 | | −5.3601 |
| 6 | aspheric | 8.2774 | 0.2664 | 1.6355/23.7846 | 38.1496 |
| 7 | aspheric | 1.1978 | 0.1777 | | −0.5518 |
| 8 | aspheric | −13.8559 | 0.6776 | 1.5351/55.7797 | −305.6832 |
| 9 | aspheric | −0.9161 | 0.1355 | | −0.3495 |
| 10 | aspheric | 1.7885 | 0.2667 | 1.6355/23.7846 | 0.4413 |
| 11 | aspheric | 0.8877 | 0.6237 | | −0.7288 |
| 12 | spherical | infinity | 0.2260 | 1.5168/64.1673 | |
| 13 | spherical | infinity | 0.2036 | | |
| IMG | spherical | infinity | | | |

The table below shows high-order coefficients A4, A6, A8, A10, A12, A14 and A16 of aspheric shapes of the aspheric lens.

TABLE 12

| Surface No. | A4 | A6 | A8 | A10 | A12 | A14 | A16 |
|---|---|---|---|---|---|---|---|
| 1 | 3.2100E−01 | −2.4090E−01 | 1.6155E−01 | −4.3896E−02 | −5.8545E−02 | 3.5221E−02 | −7.9882E−03 |
| 2 | 5.0412E−01 | −2.6082E−01 | 1.0055E+00 | −1.0770E+00 | −8.6158E−01 | 4.3420E+00 | −4.1074E+00 |
| 4 | 8.2821E−01 | −8.0395E+00 | 5.3526E+01 | −2.4719E+02 | 6.8704E+02 | −1.0436E+03 | 6.5161E+02 |
| 5 | −5.2204E−01 | 1.6017E+00 | −6.5898E+00 | 1.4524E+01 | −1.7764E+01 | 9.0950E+00 | −1.2489E+00 |
| 6 | −5.2028E−01 | 1.4378E+00 | −2.8244E+00 | 2.7665E+00 | −7.5406E−02 | −1.8733E+00 | 1.1204E+00 |
| 7 | −7.6776E−01 | 1.4346E+00 | −1.9501E+00 | 1.9989E+00 | −1.5584E+00 | 1.0434E+00 | −4.0342E−01 |
| 8 | 3.0356E−01 | −8.3524E−01 | 1.5372E+00 | −9.8339E−01 | −6.3318E−01 | 1.4121E+00 | −6.2158E−01 |
| 9 | 4.6473E−01 | −3.5982E−01 | 1.4132E−01 | 3.1245E−01 | −1.3771E−01 | −3.2463E−01 | 3.0635E−01 |
| 10 | −7.2154E−01 | 2.4926E−02 | −1.9140E−02 | 4.5204E−01 | −7.8929E−01 | 2.1257E−01 | 4.1311E−02 |
| 11 | −1.1884E+00 | 1.2002E+00 | −9.3802E−01 | 2.9360E−01 | 1.2838E−01 | −1.2430E−01 | 1.8870E−02 |

Figure 31:
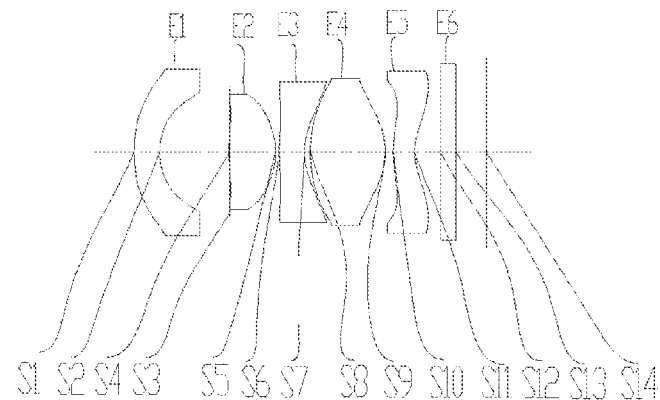
FIG. 31 is a schematic view of the lens assembly according to Embodiment 7 of the present disclosure.
Figure 32:
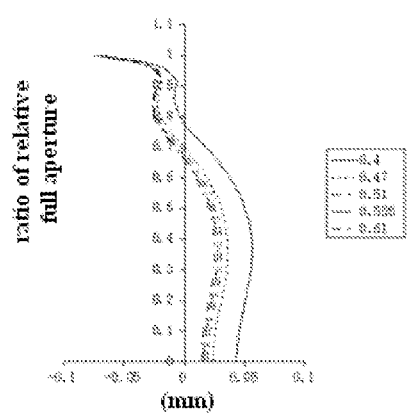
FIGS. 32 to 35 are diagrams showing a longitudinal aberration (mm) curve, an astigmatism curve (mm), a distortion curve (%) and a lateral color curve (μm) of the lens assembly in Embodiment 7, respectively.
Figure 33:
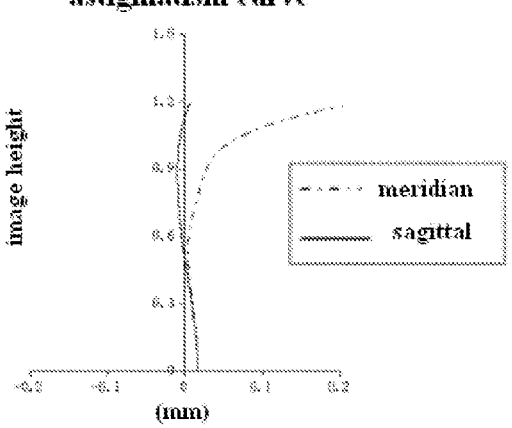
Figure 34:
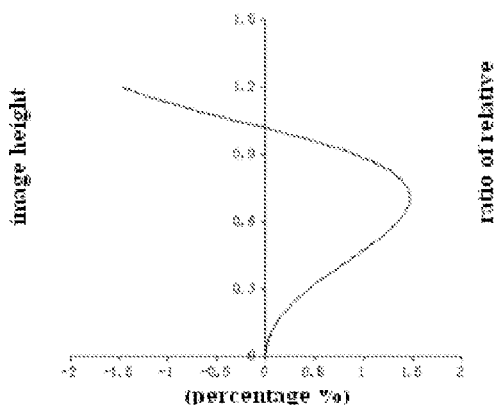
Figure 35:
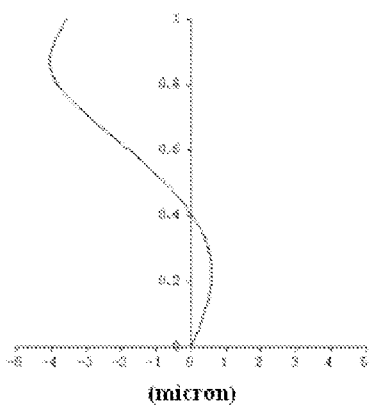

Referring to FIG. 31, in Embodiment 7, the lens assembly includes a first lens E1, a diaphragm, a second lens E2, a third lens E3, a fourth lens E4 and a fifth lens E5, a filter E6 and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the five lenses are made of a glass material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 7, each of the parameters is described as below:

TTL=4.69; f=1.57; f1=−3.72; f2=1.49; f3=−1.82; f4=1.3; f5=−2.62; (R3+R4)/(R3−R4)=0.57; f1/f2=−2.5; T12/T23=17.18;

(T12+T23+T34+T45)/TTL=0.25; f2/f=0.95; SD/TD=0.66;

ImgH/TTL=0.26; f1/f=−2.37;

A system parameter: Fno=1.6.

TABLE 13

| Surface No. | Surface type | Curvature radius | Thickness | Material | Conic coefficient |
|---|---|---|---|---|---|
| obj | spherical | infinity | 300.0000 | | |
| 1 | aspheric | 2.3105 | 0.3391 | 1.5351/55.7797 | 1.6269 |
| 2 | aspheric | 1.0157 | 0.9271 | | 0.2139 |
| stop | spherical | infinity | −0.0029 | | |
| 4 | aspheric | 3.5665 | 0.6156 | 1.5351/55.7797 | −0.6971 |
| 5 | aspheric | −0.9661 | 0.0538 | | −0.4074 |
| 6 | aspheric | 3.0845 | 0.3316 | 1.6355/23.7846 | 10.2015 |
| 7 | aspheric | 0.8092 | 0.0844 | | −0.3133 |
| 8 | aspheric | 2.2818 | 0.9997 | 1.5351/55.7797 | 1.4402 |
| 9 | aspheric | −0.8551 | 0.1033 | | −0.4447 |
| 10 | aspheric | 1.4724 | 0.2843 | 1.6355/23.7846 | 1.0846 |
| 11 | aspheric | 0.7251 | 0.3438 | | −0.8317 |
| 12 | spherical | infinity | 0.2100 | 1.5168/64.1673 | |
| 13 | spherical | infinity | 0.4045 | | |
| IMG | spherical | infinity | | | |

The table below shows high-order coefficients A4, A6, A8, A10, A12, A14 and A 16 of aspheric shapes of the aspheric lens.

TABLE 14

| Surface No. | A4 | A6 | A8 | A10 | A12 | A14 | A16 |
|---|---|---|---|---|---|---|---|
| 1 | 2.6764E−01 | −3.3904E−01 | 2.6248E−01 | −5.8621E−02 | −1.1157E−01 | 9.5492E−02 | −2.7247E−02 |
| 2 | 5.5557E−01 | −9.5574E−01 | 2.4172E+00 | −3.0400E+00 | −2.2619E+00 | 1.1504E+01 | −1.0377E+01 |
| 4 | −4.4800E−02 | −2.2882E−02 | −1.9966E+00 | 3.5101E+00 | 1.9300E+01 | −1.2383E+02 | 1.6283E+02 |
| 5 | 3.2720E−01 | −7.9476E−01 | 2.7284E−01 | 2.4559E−01 | −4.1130E−01 | −9.9328E−01 | 4.3705E−01 |
| 6 | −5.5949E−01 | 8.2609E−01 | −1.8362E+00 | 1.6012E+00 | 3.0205E+00 | −5.6766E+00 | 2.0662E+00 |
| 7 | −8.8784E−01 | 1.0083E+00 | −1.3582E+00 | 5.3094E−01 | 7.0463E−01 | −3.2739E−01 | −5.8405E−01 |
| 8 | 4.0758E−01 | −1.2143E+00 | 1.9195E+00 | −9.2129E−01 | −1.8669E+00 | 3.0141E+00 | −1.3024E+00 |
| 9 | 4.6427E−01 | −3.7540E−01 | 2.4553E−01 | 6.0803E−01 | −2.6269E−01 | −1.0388E+00 | 8.0266E−01 |
| 10 | −6.5879E−01 | −7.6036E−02 | 5.7429E−01 | −3.7472E−01 | −4.4778E−01 | 4.1105E−01 | −1.0269E−01 |
| 11 | −1.2399E+00 | 1.4941E+00 | −1.4357E+00 | 6.2817E−01 | 2.2594E−01 | −3.8581E−01 | 1.2912E−01 |

Figure 36:
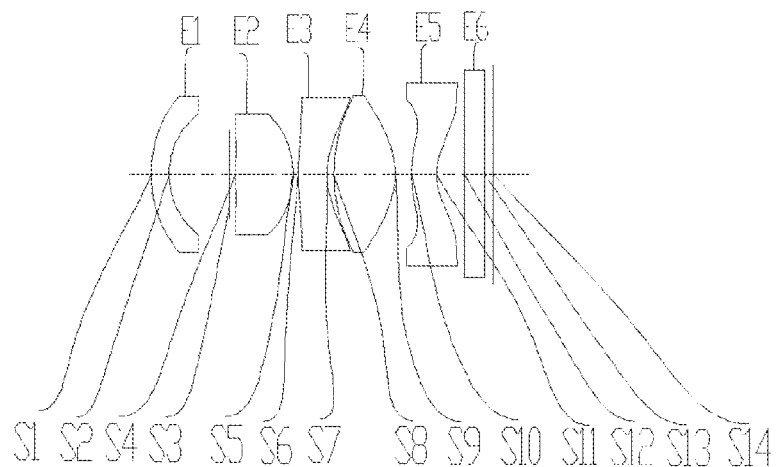
FIG. 36 is a schematic view of the lens assembly according to Embodiment 8 of the present disclosure.
Figure 37:
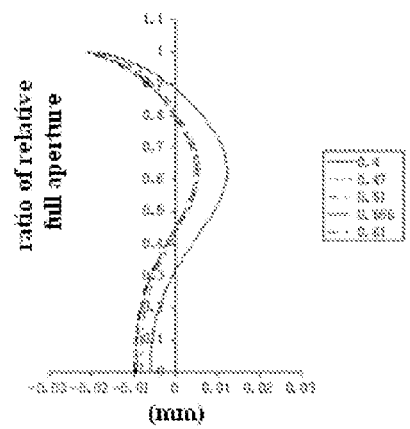
FIGS. 37 to 40 are diagrams showing a longitudinal aberration (mm) curve, an astigmatism curve (mm), a distortion curve (%) and a lateral color curve (μm) of the lens assembly in Embodiment 8, respectively.
Figure 38:
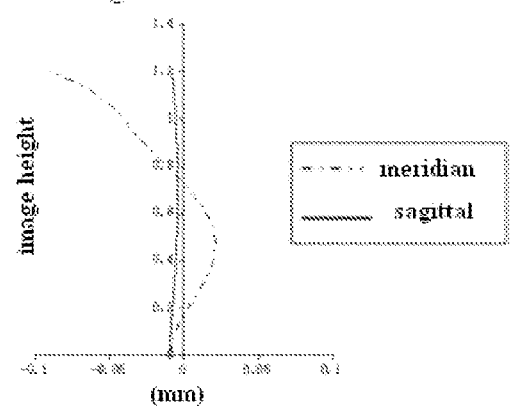
Figure 39:
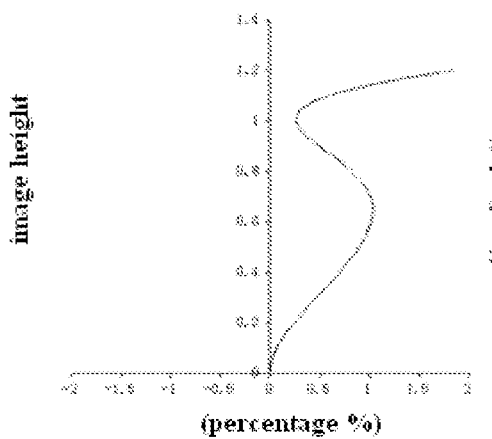
Figure 40:
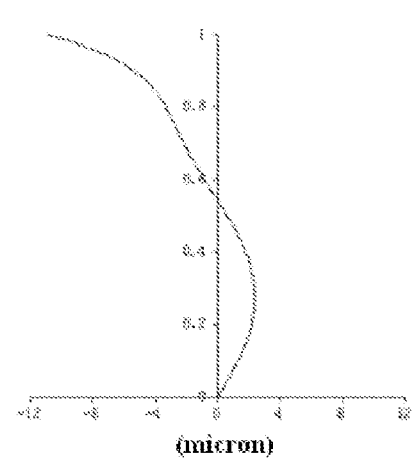

Referring to FIG. 36, in Embodiment 8, the lens assembly includes a first lens E1, a diaphragm, a second lens E2, a third lens E3, a fourth lens E4 and a fifth lens E5, a filter E6, and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 8, each of the parameters is described as below:

TTL=3.85; f=1.3; f1=−4.81; f2=1.56; f3=−2.21; f4=1.25; f5=−2.69; (R3+R4)/(R3−R4)=0.77; f1/f2=−3.08; T12/T23=13.06;
(T12+T23+T34+T45)/TTL=0.28; f2/f=1.2; SD/TD=0.73; ImgH/TTL=0.31; f1/f=−3.71;
A system parameter: Fno=1.68.

TABLE 15

| Surface No. | Surface type | Curvature radius | Thickness | Material | Conic coefficient |
|---|---|---|---|---|---|
| obj | spherical | infinity | 325.4607 | | |
| 1 | aspheric | 1.7157 | 0.2009 | 1.5351/55.7797 | −0.2871 |
| 2 | aspheric | 0.9886 | 0.6797 | | 0.4179 |
| stop | spherical | infinity | 0.0657 | | |
| 4 | aspheric | 7.6503 | 0.6462 | 1.5858/60.8160 | −167.1235 |
| 5 | aspheric | −1.0092 | 0.0571 | | −1.0295 |
| 6 | aspheric | 2.1611 | 0.3220 | 1.6355/23.7846 | −45.8562 |
| 7 | aspheric | 0.8043 | 0.0815 | | −0.8370 |
| 8 | aspheric | 2.2115 | 0.6916 | 1.5351/55.7797 | 0.5610 |
| 9 | aspheric | −0.8583 | 0.1832 | | −0.4153 |
| 10 | aspheric | 1.0860 | 0.2794 | 1.6355/23.7846 | −0.0275 |
| 11 | aspheric | 0.5995 | 0.3151 | | −1.3155 |
| 12 | spherical | infinity | 0.2278 | 1.5168/64.1673 | |
| 13 | spherical | infinity | 0.0967 | | |
| IMG | spherical | infinity | | | |

The table below shows high-order coefficients A4, A6, A8, A10, A12, A14 and A16 of aspheric shapes of the aspheric lens.

TABLE 16

| Surface No. | A4 | A6 | A8 | A10 | A12 | A14 | A16 |
|---|---|---|---|---|---|---|---|
| 1 | 2.3487E−01 | −1.9353E−01 | 1.1005E−01 | −5.6828E−02 | −2.4096E−02 | 5.8029E−02 | −4.9207E−02 |
| 2 | 3.2402E−01 | −5.2706E−01 | 1.0188E+00 | −1.5790E+00 | −9.2413E−01 | 3.0602E+00 | −5.7885E+00 |
| 4 | −1.2882E−01 | −3.6248E+00 | 3.7099E+01 | −2.1527E+02 | 6.2646E+02 | −9.4401E+02 | 7.0055E+02 |
| 5 | −3.5710E−01 | 1.8352E+00 | −7.6956E+00 | 1.4515E+01 | −1.6194E+01 | 8.0144E+00 | −1.1201E+00 |
| 6 | −3.5960E−01 | 1.2592E+00 | −2.7464E+00 | 2.6201E+00 | 4.8130E−02 | −1.7411E+00 | 1.0396E+00 |
| 7 | −8.1571E−01 | 1.3588E+00 | −1.9003E+00 | 1.8090E+00 | −1.4500E+00 | 9.5462E−01 | −3.2588E−01 |
| 8 | 2.9764E−01 | −8.7676E−01 | 1.3934E+00 | −9.4737E−01 | −5.9347E−01 | 1.2841E+00 | −5.3601E−01 |
| 9 | 4.0095E−01 | −2.5153E−01 | 1.2662E−01 | 2.8032E−01 | −1.2586E−01 | −2.9837E−01 | 2.8796E−01 |
| 10 | −8.8965E−01 | −9.8430E−02 | 2.3196E−01 | −7.2364E−02 | −1.2608E−01 | 7.1673E−02 | −2.1413E−01 |
| 11 | −1.1183E+00 | 1.2561E+00 | −9.4452E−01 | 3.1105E−01 | 1.2708E−01 | −1.2127E−01 | 2.3915E−02 |

Figure 41:
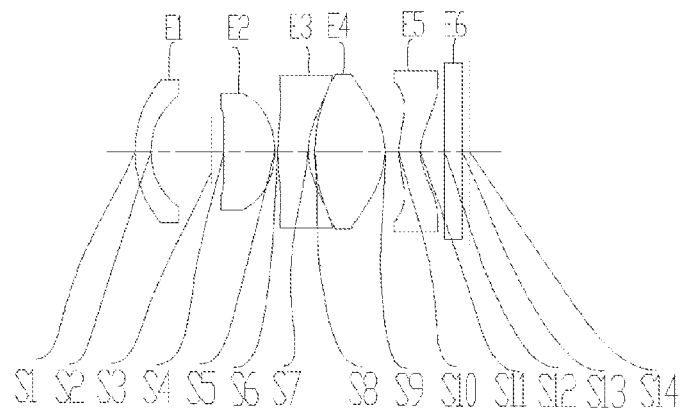
FIG. 41 is a schematic view of the lens assembly according to Embodiment 9 of the present disclosure.
Figure 42:
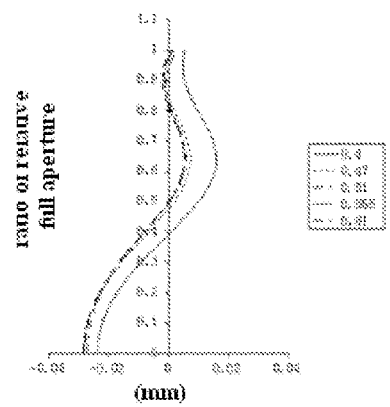
FIGS. 42 to 45 are diagrams showing a longitudinal aberration (mm) curve, an astigmatism curve (mm), a distortion curve (%) and a lateral color curve (μm) of the lens assembly in Embodiment 9, respectively.
Figure 43:
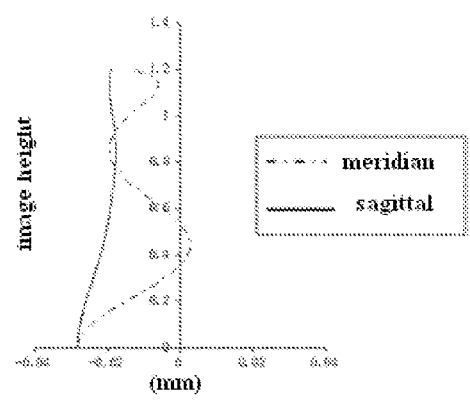
Figure 44:
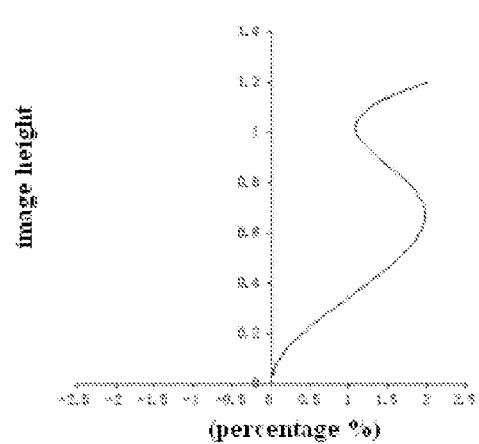
Figure 45:
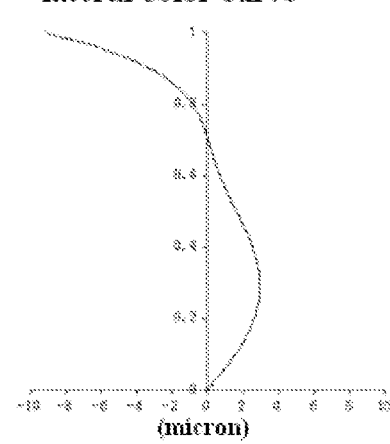

Referring to FIG. 41, in Embodiment 9, the lens assembly includes a first lens E1, a diaphragm, a second lens E2, a third lens E3, a fourth lens E4 and a fifth lens E5, a filter E6, and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 9, each of the parameters is described as below:
TTL=4.29; f=1.31; f1=−4.82; f2=1.57; f3=−2.18; f4=1.29; f5=−2.64; (R3+R4)/(R3−R4)=0.88; f1/f2=−3.07; T12/T23=24.31;
(T12+T23+T34+T45)/TTL=0.29; f2/f=1.2; SD/TD=0.73; ImgH/TTL=0.28; f1/f=−3.69;
A system parameter: Fno=1.68.

TABLE 17

| Surface No. | Surface type | Curvature radius | Thickness | Material | Conic coefficient |
|---|---|---|---|---|---|
| obj | spherical | infinity | 325.4607 | | |
| 1 | aspheric | 1.7654 | 0.2006 | 1.5351/55.7797 | −0.3322 |
| 2 | aspheric | 1.0074 | 0.7755 | | 0.4072 |
| stop | spherical | infinity | 0.1620 | | |
| 4 | aspheric | 14.7192 | 0.6543 | 1.5858/60.8160 | −469.1618 |
| 5 | aspheric | −0.9654 | 0.0383 | | −1.0608 |
| 6 | aspheric | 2.1850 | 0.3864 | 1.6355/23.7846 | −48.1600 |
| 7 | aspheric | 0.7939 | 0.0865 | | −0.8285 |
| 8 | aspheric | 2.2711 | 0.9059 | 1.5351/55.7797 | 0.4725 |
| 9 | aspheric | −0.8544 | 0.1777 | | −0.4108 |
| 10 | aspheric | 1.0844 | 0.2736 | 1.6355/23.7846 | 0.0376 |
| 11 | aspheric | 0.5953 | 0.3073 | | −1.2853 |
| 12 | spherical | infinity | 0.2278 | 1.5168/64.1673 | |
| 13 | spherical | infinity | 0.0967 | | |
| IMG | spherical | infinity | | | |

The table below shows high-order coefficients A4, A6, A8, A10, A12, A14 and A16 of aspheric shapes of the aspheric lens.

Figure 46:
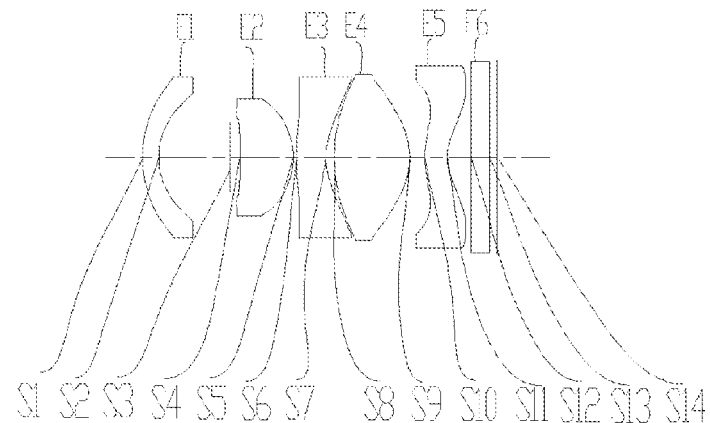
FIG. 46 is a schematic view of the lens assembly according to Embodiment 10 of the present disclosure.
Figure 47:
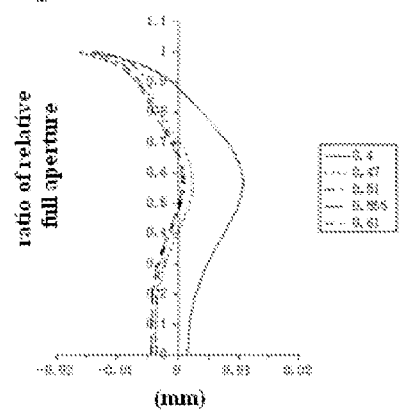
FIGS. 47 to 50 are diagrams showing a longitudinal aberration (mm) curve, an astigmatism curve (mm), a distortion curve (%) and a lateral color curve (μm) of the lens assembly in Embodiment 10, respectively.
Figure 48:
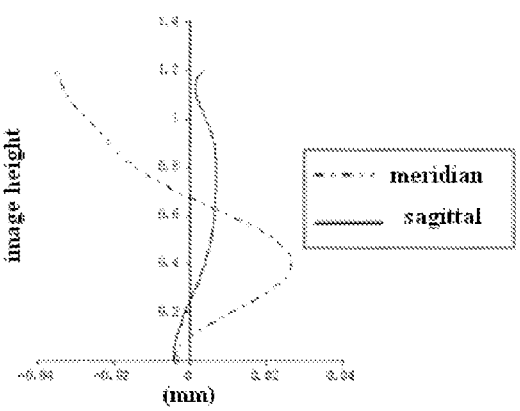
Figure 49:
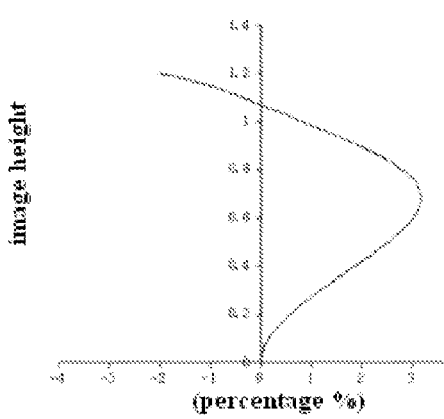
Figure 50:
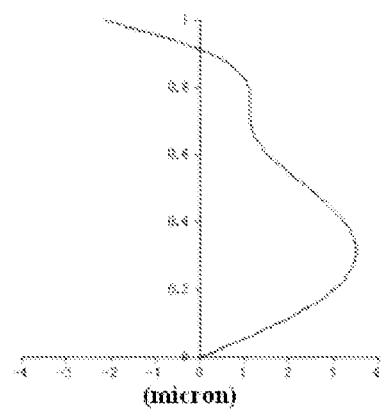
Figure 51:
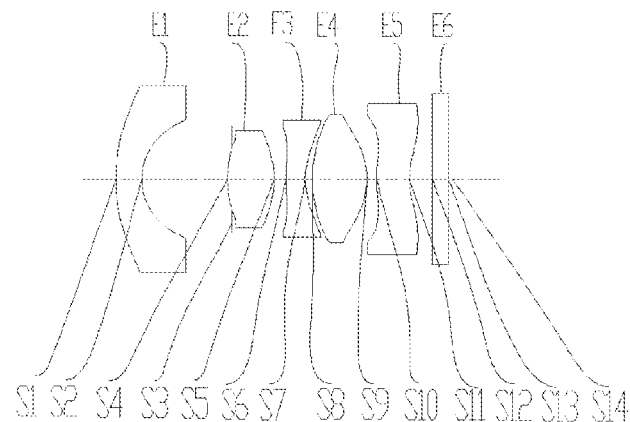
FIG. 51 is a schematic view of the lens assembly according to Embodiment 11 of the present disclosure.
Figure 52:
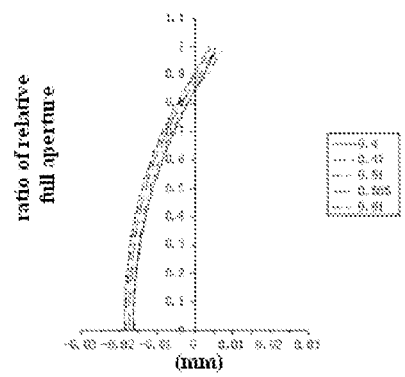
FIGS. 52 to 55 are diagrams showing a longitudinal aberration (mm) curve, an astigmatism curve (mm), a distortion curve (%) and a lateral color curve (μm) of the lens assembly in Embodiment 11, respectively.
Figure 53:
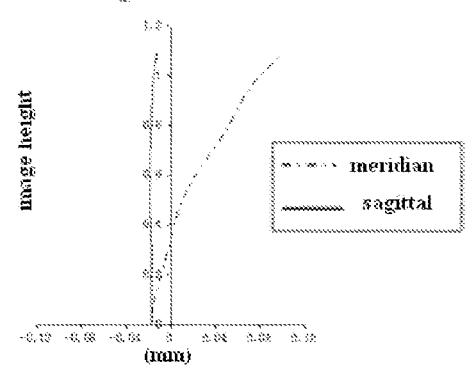
Figure 54:
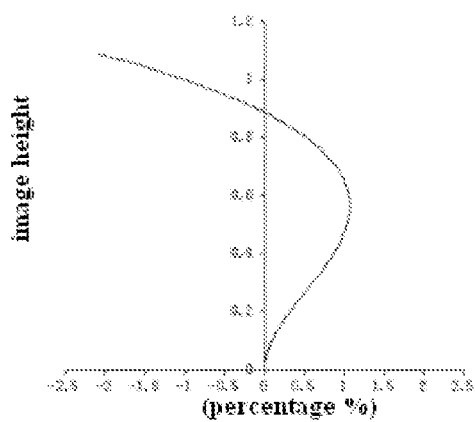

Referring to FIG. 46, in Embodiment 10, the lens assembly includes a first lens E1, a diaphragm, a second lens E2, a third lens E3, a fourth lens E4 and a fifth lens E5, a filter E6, and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a concavity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the second lens E2 is made of a glass material, and other lenses are made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 10, each of the parameters is described as below:
TTL=4.39; f=1.27; f1=−4.83; f2=1.55; f3=−2.15; f4=1.29; f5=−2.62; (R3+R4)/(R3−R4)=1.07; f1/f2=−3.12; T12/T23=24.49;
(T12+T23+T34+T45)/TTL=0.3; f2/f=1.22; SD/TD=0.71; ImgH/TTL=0.27; f1/f=−3.81;
A system parameter: Fno=1.68.

TABLE 18

| Surface No. | A4 | A6 | A8 | A10 | A12 | A14 | A16 |
|---|---|---|---|---|---|---|---|
| 1 | 2.3319E−01 | −1.9271E−01 | 1.0720E−01 | −6.2778E−02 | −3.0265E−02 | 5.5108E−02 | −4.0564E−02 |
| 2 | 3.1666E−01 | −5.5322E−01 | 9.9566E−01 | −1.5591E+00 | −7.7406E−01 | 3.5189E+00 | −4.7989E+00 |
| 4 | −1.3211E−01 | −3.6227E+00 | 3.7285E+01 | −2.1444E+02 | 6.2724E+02 | −9.5916E+02 | 5.5552E+02 |
| 5 | −3.5300E−01 | 1.8483E+00 | −7.6746E+00 | 1.4552E+01 | −1.6163E+01 | 7.8148E+00 | −2.5873E+00 |
| 6 | −3.6497E−01 | 1.2543E+00 | −2.7514E+00 | 2.6009E+00 | 2.2773E−02 | −1.8017E+00 | 1.0381E+00 |
| 7 | −8.1261E−01 | 1.3599E+00 | −1.8991E+00 | 1.8135E+00 | −1.4402E+00 | 9.6344E−01 | −3.3339E−01 |
| 8 | 2.9575E−01 | −8.7642E−01 | 1.3945E+00 | −9.4743E−01 | −5.9638E−01 | 1.2829E+00 | −5.2082E−01 |
| 9 | 4.0256E−01 | −2.5422E−01 | 1.2023E−01 | 2.7154E−01 | −1.3540E−01 | −3.0812E−01 | 2.7684E−01 |
| 10 | −8.6746E−01 | −8.1095E−02 | 2.4798E−01 | −4.8684E−02 | −9.3096E−02 | 1.1559E−01 | −1.6400E−01 |
| 11 | −1.1372E+00 | 1.2271E+00 | −9.2250E−01 | 3.1877E−01 | 1.2682E−01 | −1.2413E−01 | 2.0446E−02 |

TABLE 19

| Surface No. | Surface type | Curvature radius | Thickness | Material | Conic coefficient |
|---|---|---|---|---|---|
| obj | spherical | infinity | 325.4607 | | |
| 1 | aspheric | 1.8033 | 0.1992 | 1.5351/55.7797 | −0.2782 |
| 2 | aspheric | 1.0229 | 0.8831 | | 0.3783 |
| stop | spherical | infinity | 0.1213 | | |
| 4 | aspheric | −26.3678 | 0.6595 | 1.5858/60.8160 | 119.1316 |
| 5 | aspheric | −0.8889 | 0.0410 | | −1.0277 |
| 6 | aspheric | 2.2085 | 0.3611 | 1.6355/23.7846 | −46.7081 |
| 7 | aspheric | 0.7942 | 0.1063 | | −0.8307 |
| 8 | aspheric | 2.3392 | 0.9365 | 1.5351/55.7797 | 0.5287 |
| 9 | aspheric | −0.8449 | 0.1843 | | −0.4094 |
| 10 | aspheric | 1.0825 | 0.2764 | 1.6355/23.7846 | 0.0422 |
| 11 | aspheric | 0.5927 | 0.2976 | | −1.2222 |
| 12 | spherical | infinity | 0.2278 | 1.5168/64.1673 | |
| 13 | spherical | infinity | 0.0967 | | |
| IMG | spherical | infinity | | | |

The table below shows high-order coefficients A4, A6, A8, A10, A12, A14 and A16 of aspheric shapes of the aspheric lens.

TABLE 20

| Surface No. | A4 | A6 | A8 | A10 | A12 | A14 | A16 |
|---|---|---|---|---|---|---|---|
| 1 | 2.3539E−01 | −1.9051E−01 | 1.0892E−01 | −6.1527E−02 | −3.0380E−02 | 5.5564E−02 | −2.9992E−02 |
| 2 | 3.1293E−01 | −5.6396E−01 | 9.7072E−01 | −1.5981E+00 | −7.3807E−01 | 3.8459E+00 | −3.9815E+00 |
| 4 | −1.7092E−01 | −3.8537E+00 | 3.6729E+01 | −2.1493E+02 | 6.2992E+02 | −9.4390E+02 | 5.7838E+02 |
| 5 | −3.5806E−01 | 1.8340E+00 | −7.6900E+00 | 1.4538E+01 | −1.6187E+01 | 7.8144E+00 | −2.2469E+00 |
| 6 | −3.6168E−01 | 1.2637E+00 | −2.7431E+00 | 2.6057E+00 | 2.6144E−02 | −1.8144E+00 | 9.6105E−01 |
| 7 | −8.1325E−01 | 1.3585E+00 | −1.8997E+00 | 1.8143E+00 | −1.4411E+00 | 9.6036E−01 | −3.3593E−01 |
| 8 | 2.9653E−01 | −8.7568E−01 | 1.3944E+00 | −9.5005E−01 | −5.9904E−01 | 1.2832E+00 | −5.2034E−01 |
| 9 | 4.0128E−01 | −2.5523E−01 | 1.1955E−01 | 2.7118E−01 | −1.3518E−01 | −3.0725E−01 | 2.7763E−01 |
| 10 | −8.6466E−01 | −7.5029E−02 | 2.5027E−01 | −4.9466E−02 | −9.4679E−02 | 1.1441E−01 | −1.6371E−01 |
| 11 | −1.1258E+00 | 1.2018E+00 | −9.2985E−01 | 3.1695E−01 | 1.2593E−01 | −1.2483E−01 | 1.9834E−02 |

Figure 55:
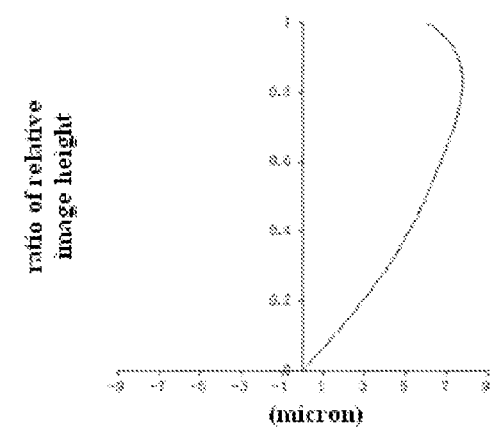

Referring to FIG. 55, in Embodiment 11, the lens assembly includes a first lens E1, a diaphragm, a second lens E2, a third lens E3, a fourth lens E4 and a fifth lens E5, a filter E6, and an imaging surface from an object side of the lens assembly to an image side of the lens assembly in turn. The first lens E1 is of a negative refracting power, an object side of the first lens is of a convexity, an image side of the first lens is of a concavity, and each of the object side and the image side thereof is in an aspheric shape; the second lens E2 is of a positive refracting power, an object side of the second lens is of a convexity, an image side of the second lens is of a convexity, and each of the object side and the image side thereof is in an aspheric shape; the third lens E3 is of a negative refracting power, an object side of the third lens is of a convexity, an image side of the third lens is of a concavity, and each of the object side and the image side thereof is in an aspheric shape; the fourth lens E4 is of a positive refracting power, an object side of the fourth lens is of a convexity, an image side of the fourth lens is of a convexity, and each of the object side and the image side thereof is in an aspheric shape; and the fifth lens E5 is of a negative refracting power, an object side of the fifth lens is of a convexity, an image side of the fifth lens is of a concavity, each of the object side and the image side thereof is in an aspheric shape, and the object side of the fifth lens is provided with one inflection point. In the lens assembly, the each of the five lenses is made of a plastic material.

From the object side of the lens assembly to the image side of the lens assembly, two sides of the first lens E1 are S1 and S2, respectively; the diaphragm is S3; two sides of the second lens E2 are S4 and S5, respectively; two sides of the third lens E3 are S6 and S7, respectively; two sides of the fourth lens E4 are S8 and S9, respectively; two sides of the fifth lens E5 are S10 and S11, respectively; two sides of the filter E6 are S12 and S13, respectively, and the optical imaging surface is S14.

In Embodiment 11, each of the parameters is described as below:

TTL=4.59; f=1.1; f1=−1.55; f2=1.32; f3=−1.88; f4=1.34; f5=−3.79; (R3+R4)/(R3−R4)=0.1; f1/f2=−1.73; T12/T23=7.01;

(T12+T23+T34+T45)/TTL=0.34; f2/f=1.2; SD/TD=0.61; ImgH/TTL=0.24; f1/f=−2.08;

A system parameter: Fno=1.6.

TABLE 21

| Surface No. | Surface type | Curvature radius | Thickness | Material | Conic coefficient |
|---|---|---|---|---|---|
| obj | spherical | infinity | infinity | | |
| 1 | aspheric | 2.9656 | 0.3525 | 1.5351/55.7797 | 3.0544 |
| 2 | aspheric | 0.8330 | 1.2275 | | −0.1093 |
| stop | spherical | infinity | −0.0621 | | |
| 4 | aspheric | 1.4478 | 0.6342 | 1.5351/55.7797 | −0.1693 |
| 5 | aspheric | −1.1817 | 0.1663 | | −0.2894 |
| 6 | aspheric | 3.1238 | 0.2598 | 1.6355/23.7846 | −5.5652 |
| 7 | aspheric | 0.8411 | 0.1009 | | −0.0787 |
| 8 | aspheric | 2.0084 | 0.7398 | 1.5351/55.7797 | −3.9642 |
| 9 | aspheric | −0.9753 | 0.1365 | | 0.0392 |
| 10 | aspheric | 2.1081 | 0.4448 | 1.6355/23.7846 | 4.7772 |
| 11 | aspheric | 1.0354 | 0.3144 | | −0.1405 |
| 12 | spherical | infinity | 0.2100 | 1.5168/64.1673 | |
| 13 | spherical | infinity | 0.0615 | | |
| IMG | spherical | infinity | | | |

The table below shows high-order coefficients A4, A6, A8, A10, A12, A14 and A16 of aspheric shapes of the aspheric lens.

TABLE 22

| Surface No. | A4 | A6 | A8 | A10 | A12 | A14 | A16 |
|---|---|---|---|---|---|---|---|
| 1 | 1.1145E−01 | −1.3495E−01 | 4.1233E−02 | 1.4141E−02 | −8.9904E−03 | −7.6771E−03 | 4.2082E−03 |
| 2 | 2.0671E−01 | −3.8365E−02 | −5.4730E−01 | 8.9745E−01 | −8.5499E−02 | −3.4050E−01 | 9.5601E−02 |
| 4 | 2.0189E−02 | −1.7731E−01 | 4.9814E−01 | −7.0800E−01 | −4.7125E−01 | 1.5298E−02 | 2.1785E+00 |
| 5 | 2.2137E−01 | −1.6979E−01 | 3.0437E−01 | −4.8373E−01 | −3.8792E−01 | −3.4744E−01 | 1.2601E+00 |
| 6 | −6.9811E−01 | 8.0823E−01 | −6.4471E−01 | −1.7199E−01 | −4.1606E−01 | −3.1909E−01 | 9.4915E−01 |
| 7 | −9.6931E−01 | 7.9185E−01 | −6.7010E−01 | 1.9689E−03 | 3.2103E−01 | 7.7302E−02 | −1.8535E+00 |
| 8 | 2.9226E−01 | −8.3380E−01 | 9.2557E−01 | 3.1058E−01 | −4.8885E−01 | −2.3327E−01 | −2.3937E−02 |
| 9 | 1.6171E−01 | 2.3637E−01 | −2.0193E−01 | −1.6717E−02 | 2.1975E−01 | 2.1369E−01 | 2.2639E−01 |
| 10 | −7.7517E−01 | 2.8120E−01 | −4.5432E−01 | 2.4297E−01 | 1.1470E−01 | −1.1618E−01 | −4.0686E−01 |
| 11 | −9.2455E−01 | 7.9411E−01 | −5.9278E−01 | 1.2383E−01 | 1.1994E−01 | −7.2975E−02 | −1.7485E−02 |

The above diagrams showing the longitudinal aberration curve, the astigmatism curve, the distortion curve and the lateral color curve of the lens assembly in each Embodiment, respectively, it can be seen that the lens assembly according to embodiments of the present disclosure has excellent optical properties.

Although explanatory embodiments and principle of the present disclosure have been described for the lens assembly, with the teaching described above of the present disclosure, various amendments and modifications made by those skilled in the art based on the embodiments described above both fall within in the scope of the disclosure. Those skilled in the art should understand that the detailed description above is only for illustrative purposes of the present disclosure and are not intended to limit the present disclosure. The scope of the present disclosure is defined by the claims and the like.

What is claimed is:

1. A lens assembly, comprising a first lens, a second lens, a third lens, a fourth lens, and a fifth lens from an object side of the lens assembly to an image side of the lens assembly in turn, wherein
   the first lens is of a negative refracting power, an object side of the first lens is of a convexity, an image side of the first lens is of a concavity; the second lens is of a positive refracting power, an image side of the second lens is of a convexity;
   the third lens is of a negative refracting power, an image side of the third lens is of a concavity;
   the fourth lens is of a positive refracting power, an image side of the fourth lens is of a convexity; and
   the fifth lens is of a negative refracting power, an object side of the fifth lens is of a convexity, an image side of the fifth lens is of a concavity, and the object side is provided with one inflection point,
   a diaphragm is arranged between the first lens and the second lens,
   the lens assembly meets the following formulas:

$0<(R3+R4)/(R3-R4)<1.2$; and $7<T12/T23<25$, wherein R3 represents a curvature radius of the object side of the second lens,
   R4 represents a curvature radius of the image side of the second lens,
   T12 represents a distance between the first lens and the second lens in a direction of an optical axis, and
   T23 represents a distance between the second lens and the third lens in the direction of the optical axis.

2. The lens assembly according to claim 1, wherein the lens assembly meets the following formulas:

$0.8<f2/f<1.4$; and $0.6<SD/TD<0.8$, wherein f2 represents a focal length of the second lens, f represents a focal length of the lens assembly,
   SD represents a distance from the diaphragm to the image side of the fifth lens in the direction of the optical axis, and
   TD represents a distance from the object side of the first lens to the image side of the fifth lens in the direction of the optical axis.

3. The lens assembly according to claim 2, wherein the second lens is made of a glass material.

4. The lens assembly according to claim 2, wherein the fourth lens is made of a glass material.

5. The lens assembly according to claim 1, wherein the object side of the second lens is of a convexity.

6. The lens assembly according to claim 5, wherein the object side of the third lens is of a convexity.

7. The lens assembly according to claim 6, wherein the object side of the fourth lens is of a convexity.

8. The lens assembly according to claim 1, wherein the lens assembly meets the following formula:

$-3.2<f1/f2<-1.4$, wherein f1 represents a focal length of the first lens, and f2 represents a focal length of the second lens.

9. The lens assembly according to claim 1, wherein the lens assembly meets the following formula:

$-4<f1/f<-2$, wherein f1 represents a focal length of the first lens, and f represents a length of the lens assembly.

10. The lens assembly according to claim 1, wherein the lens assembly meets the following formula:

$0.2<(T12+T23+T34+T45)/TTL<0.4$, wherein T12 represents the distance between the first lens and the second lens in the direction of the optical axis,
    T23 represents the distance between the second lens and the third lens in the direction of the optical axis,
    T34 represents a distance between the third lens and the fourth lens in the direction of the optical axis,
    T45 represents a distance between the fourth lens and the fifth lens in the direction of the optical axis, and
    TTL represents a total track length of the lens assembly.

11. The lens assembly according to claim 1, wherein the lens assembly meets the following formula:

$0.2<ImgH/TTL<0.4$, wherein ImgH represents a half-length of a diagonal of an effective pixel region of the lens assembly at an imaging plane, and TTL represents a total track length of the lens assembly.

12. The lens assembly according to claim 2, wherein the object side of the second lens is of a convexity.

13. The lens assembly according to claim 2, wherein the lens assembly meets the following formula:

$$-3.2 < f1/f2 < -1.4,$$

wherein f1 represents a focal length of the first lens, and f2 represents a focal length of the second lens.

14. The lens assembly according to claim 7, wherein the lens assembly meets the following formula:

$$-3.2 < f1/f2 < -1.4,$$

wherein f1 represents a focal length of the first lens, and f2 represents a focal length of the second lens.

15. The lens assembly according to claim 2, wherein the lens assembly meets the following formula:

$$-4 < f1/f < -2,$$

wherein f1 represents a focal length of the first lens, and f represents a length of the lens assembly.

16. The lens assembly according to claim 7, wherein the lens assembly meets the following formula:

$$-4 < f1/f < -2,$$

wherein f1 represents a focal length of the first lens, and f represents a length of the lens assembly.

17. The lens assembly according to claim 2, wherein the lens assembly meets the following formula:

$$0.2 < (T12+T23+T34+T45)/TTL < 0.4,$$

wherein T12 represents the distance between the first lens and the second lens in the direction of the optical axis, T23 represents the distance between the second lens and the third lens in the direction of the optical axis, T34 represents a distance between the third lens and the fourth lens in the direction of the optical axis, T45 represents a distance between the fourth lens and the fifth lens in the direction of the optical axis, and TTL represents a total track length of the lens assembly.

18. The lens assembly according to claim 7, wherein the lens assembly meets the following formula:

$$0.2 < (T12+T23+T34+T45)/TTL < 0.4,$$

wherein T12 represents the distance between the first lens and the second lens in the direction of the optical axis, T23 represents the distance between the second lens and the third lens in the direction of the optical axis, T34 represents a distance between the third lens and the fourth lens in the direction of the optical axis, T45 represents a distance between the fourth lens and the fifth lens in the direction of the optical axis, and TTL represents a total track length of the lens assembly.

19. The lens assembly according to claim 2, wherein the lens assembly meets the following formula:

$$0.2 < ImgH/TTL < 0.4,$$

wherein ImgH represents a half-length of a diagonal of an effective pixel region of the lens assembly at an imaging plane, and TTL represents a total track length of the lens assembly.

20. The lens assembly according to claim 7, wherein the lens assembly meets the following formula:

$$0.2 < ImgH/TTL < 0.4,$$

wherein ImgH represents a half-length of a diagonal of an effective pixel region of the lens assembly at an imaging plane, and TTL represents a total track length of the lens assembly.

* * * * *